United States Patent
Rezk et al.

(10) Patent No.: US 11,632,273 B1
(45) Date of Patent: Apr. 18, 2023

(54) PROCESSING MULTIUSER MULTIPLE-INPUT MULTIPLE-OUTPUT COMMUNICATIONS HAVING UNAVAILABLE SPATIAL STREAMS

(71) Applicant: QUALCOMM Incorporated, San Diego, CA (US)

(72) Inventors: Meriam Rezk, Campbell, CA (US); Deniz Rende, San Jose, CA (US); Kapil Rai, Sunnyvale, CA (US); Chin-Hung Chen, Milpitas, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/457,402

(22) Filed: Dec. 2, 2021

(51) Int. Cl.
| | |
|---|---|
| *H04L 1/02* | (2006.01) |
| *H04L 25/02* | (2006.01) |
| *H04B 7/0452* | (2017.01) |
| *H04B 7/0426* | (2017.01) |
| *H04L 1/00* | (2006.01) |

(52) U.S. Cl.
CPC ....... *H04L 25/0244* (2013.01); *H04B 7/0439* (2013.01); *H04B 7/0452* (2013.01); *H04L 25/0204* (2013.01); *H04L 1/0003* (2013.01)

(58) Field of Classification Search
CPC .. H04B 7/0413; H04B 17/318; H04B 7/0417; H04B 17/101; H04B 7/0695; H04B 17/24; H04B 7/0617; H04B 7/0452; H04B 17/364; H04B 7/0632; H04B 7/0691; H04B 17/336; H04B 7/088; H04L 5/006; H04L 1/06; H04L 25/0204; H04L 43/08; H04L 43/16; H04L 43/0811; H04L 5/0091; H04L 5/0057; H04L 25/0224; H04W 56/0005
USPC .................................. 375/267, 260, 262
See application file for complete search history.

(56) References Cited

U.S. PATENT DOCUMENTS

| | | | |
|---|---|---|---|
| 2015/0162960 A1* | 6/2015 | Coffey | H04B 7/0413 370/329 |
| 2019/0081664 A1* | 3/2019 | Vermani | H04B 7/024 |
| 2020/0076665 A1* | 3/2020 | Porat | H04B 7/024 |
| 2020/0178043 A1 | 6/2020 | Cavalcanti et al. | |
| 2020/0374872 A1* | 11/2020 | Wu | H04B 7/063 |
| 2021/0307099 A1* | 9/2021 | Ryu | H04L 1/1896 |
| 2022/0030604 A1* | 1/2022 | Noh | H04W 72/04 |
| 2022/0190880 A1* | 6/2022 | Chitrakar | H04L 5/0044 |

* cited by examiner

*Primary Examiner* — Khai Tran
(74) *Attorney, Agent, or Firm* — Polsinelli LLP

(57) ABSTRACT

This disclosure provides methods, devices and systems for determining unavailable spatial streams in uplink multiuser (MU) multiple-in multiple-out (MIMO) communication. In one example, a device transmits, to wireless stations including a first wireless station, a trigger frame configured to elicit a joint transmission, to the device, of a MU packet over spatial streams respectively associated with the wireless stations. The device receives the MU packet over the spatial streams, where each spatial stream of the spatial streams is received by receive chains of the device. The device performs a channel estimation associated with each spatial stream of the spatial streams using each receive chain of the receive chains. The device determines that at least one spatial stream associated with the first wireless station is unavailable based on the channel estimation. The device processes the MU packet from the plurality of spatial streams without the at least one spatial stream.

28 Claims, 24 Drawing Sheets

PROCESSING MULTIUSER MULTIPLE-INPUT MULTIPLE-OUTPUT COMMUNICATIONS HAVING UNAVAILABLE SPATIAL STREAMS

TECHNICAL FIELD

This disclosure relates generally to wireless communication, and more specifically to identifying unavailable spatial streams in uplink multiuser (MU) multiple-input multiple-output (MIMO) communications and processing remaining streams in the MU-MIMO communications.

BACKGROUND

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a BSS Identifier (BSSID) that is advertised by the AP. An AP periodically broadcasts beacon frames to enable any STAs within wireless range of the AP to establish or maintain a communication link with the WLAN.

Some wireless communications systems (for example, Wi-Fi or WLAN systems) may support joint uplink (UL) transmission of a multiuser (MU) packet from one or more STAs to an AP. In some examples, an access point (AP) may detect multiple STAs having buffered data for transmission to the AP and determine to elicit an UL MU packet from some or all of the STAs. In such cases, the AP may send a trigger frame to the multiple STAs that indicates one or more resource allocations for each STA. In response to the trigger frame, each of the STAs concurrently transmits UL data on its assigned resources. Specifically, for an UL MU multiple-input multiple-output (MIMO) communication, the AP can allocate different respective spatial streams to each of multiple STAs for use in transmitting their UL data. Similarly, for an UL orthogonal frequency division multiple access (OFDMA) communication, the AP can allocate different respective sets of tones (referred to as resource units (RUs)) to the STAs for use in transmitting their UL data. In some cases, MU-MIMO can be combined with OFDMA. Specifically, the AP can allocate a same RU to multiple STAs and each of the multiple STAs may transmit via the same tones of the RU but via different respective orthogonal spatial streams.

Whether for an UL MU-MIMO or combined MU-MIMO and OFDMA transmission, when the AP receives the spatial streams, the AP combines the spatial streams and jointly demodulates and decodes the combined spatial streams as an UL MU PPDU. Because the AP is sensitive to power level deviations when decoding the spatial streams (which constitute the MU packet), the spatial streams transmitted by the respective STAs should be received at the AP at substantially similar power levels. Otherwise, when the power levels of the received spatial streams vary too much with respect to each other, the AP may not be able to decode the MU PPDU or the decoding may result in errors.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication by a wireless access point. The method includes transmitting, to a plurality of wireless stations including a first wireless station, a trigger frame configured to elicit a joint transmission, to the wireless access point, of a multiuser (MU) packet over a plurality of spatial streams respectively associated with the plurality of wireless stations. The method further includes receiving the MU packet over the plurality of spatial streams. Each spatial stream of the plurality of spatial streams are received by a plurality of receive chains of the wireless access point. The method includes performing a channel estimation associated with each spatial stream of the plurality of spatial streams using each receive chain of the plurality of receive chains. The method further includes determining that at least one spatial stream associated with the first wireless station is unavailable based on the channel estimation. The method includes processing the MU packet from the plurality of spatial streams without the at least one spatial stream.

Another innovative aspect of the subject matter described in this disclosure can be implemented in a wireless communication device. The wireless communication device includes at least one modem. The wireless communication device can further include at least one transceiver coupled to the at least one modem and at least one antenna coupled to the at least one transceiver to wirelessly transmit signals output from the at least one transceiver and to wirelessly receive signals for input into the at least one transceiver. The wireless communication device further includes at least one processor communicatively coupled with the at least one modem and at least one memory communicatively coupled with the at least one processor and storing processor-readable code that, when executed by the at least one processor in conjunction with the at least one modem is configured to: transmit, to a plurality of wireless stations including a first wireless station, a trigger frame configured to elicit a joint transmission, to the wireless communication device, of a multiuser (MU) packet over a plurality of spatial streams respectively associated with the plurality of wireless stations; receive the MU packet over the plurality of spatial streams, each spatial stream of the plurality of spatial streams being received by a plurality of receive chains of the wireless communication device; perform a channel estimation associated with each spatial stream of the plurality of spatial streams using each receive chain of the plurality of receive chains; determine that at least one spatial stream associated with the first wireless station is unavailable based on the channel estimation; and process the MU packet from the plurality of spatial streams without the at least one spatial stream.

In some implementations, the method and wireless communication device may be configured to determine, for each spatial stream of the plurality of spatial streams for each receive chain of the plurality of receive chains, a respective power metric based on a respective channel estimate associated with each spatial stream of the plurality of spatial streams and each receive chain of the plurality of receive chains.

In some implementations, to determine that the at least one spatial stream associated with the first wireless station is unavailable, the method and wireless communication device may be configured to: determine that the respective power metric for the at least one spatial stream associated with the first wireless station is less than a threshold; and determine that the at least one spatial stream associated with the first wireless station is not transmitted by the first wireless station based on the respective power metric being less than the threshold.

In some implementations, to determine that the at least one spatial stream associated with the first wireless station is unavailable, the method and wireless communication device may be configured to: determine that the at least one spatial stream associated with the first wireless station cannot be received by the wireless access point at a suitable power level for the MU packet based on a maximum received power for the plurality of spatial streams and based on a difference between the respective power metric of the at least one spatial stream and the maximum received power being greater than a threshold.

In some implementations, to determine the respective power metric based on the respective channel estimate, the method and wireless communication device may be configured to: determine a first receive chain of the plurality of receive chains having a maximum received power for each spatial stream in the plurality of spatial streams; and determine a second receive chain of the plurality of receive chains having a minimum received power for each spatial stream in the plurality of spatial streams.

In some implementations, to process the MU packet from the plurality of spatial streams without the at least one spatial stream associated with the first wireless station, the method and wireless communication device may be configured to: remove the at least one spatial stream associated with the first wireless station from a tracking matrix associated with a pilot sequence; perform an inverse error estimation of the tracking matrix based on removal of the at least one spatial stream; and generate a phase offset for the plurality of wireless stations based on the inverse error estimation.

In some implementations, to process the MU packet from the plurality of spatial streams without at least one spatial stream associated with the first wireless station, the method and wireless communication device may be configured to: remove one or more entries associated with the first wireless station from a demodulation matrix; and demodulate one or more spatial streams of the plurality of spatial streams based on removal of the one or more entries associated with the first wireless station from the demodulation matrix.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Like reference numbers and designations in the various drawings indicate like elements.

DETAILED DESCRIPTION

Figure 1:
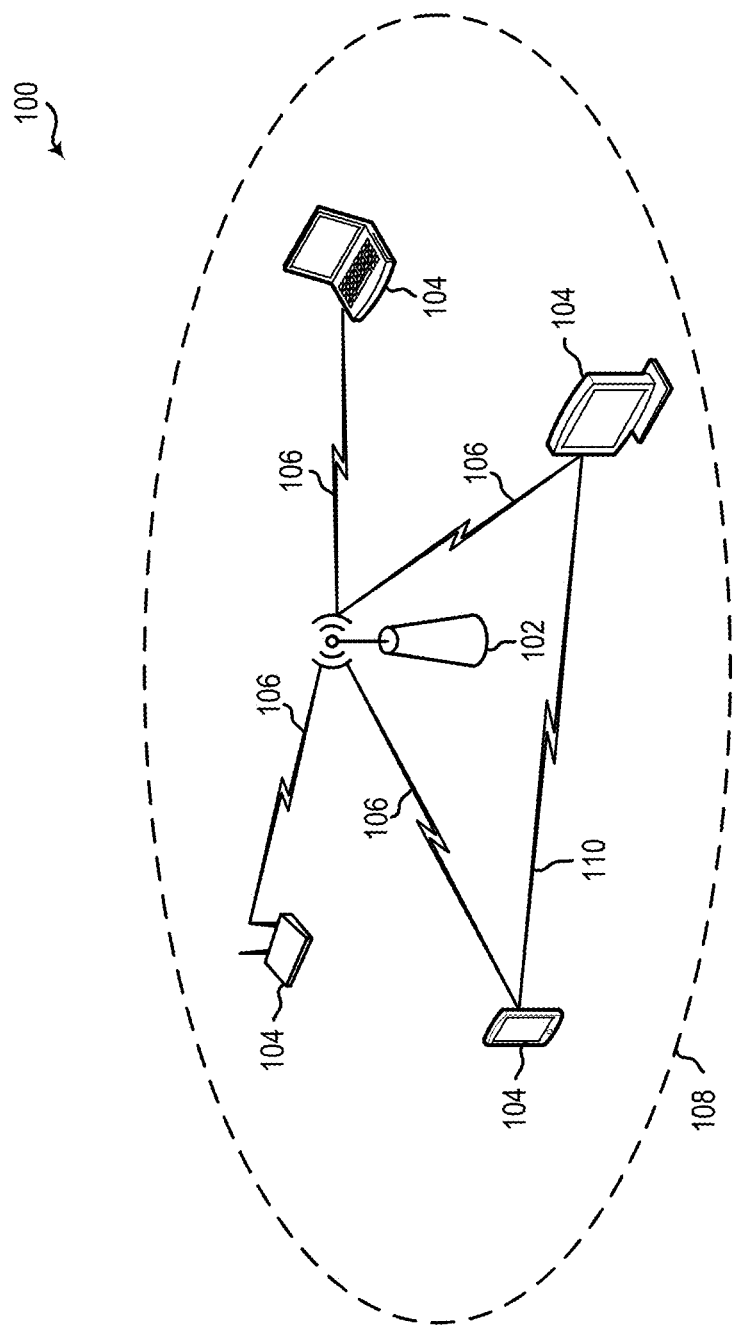
FIG. 1 shows a block diagram of an example wireless communication network, in accordance with some examples.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multiuser (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Some wireless communications systems (for example, Wi-Fi or WLAN systems) may support joint uplink (UL) transmission of a multiuser (MU) packet from one or more STAs to an AP. In some examples, an access point (AP) may detect multiple STAs having buffered data for transmission to the AP and determine to elicit an UL MU packet from some or all of the STAs. In such cases, the AP may send a trigger frame to the multiple STAs that indicates one or more resource allocations for each STA. In response to the trigger frame, each of the STAs concurrently transmits UL data on its assigned resources. Specifically, for an UL MU multiple-input multiple-output (MIMO) communication, the AP can allocate different respective spatial streams to each of multiple STAs for use in transmitting their UL data. Similarly, for an UL orthogonal frequency division multiple access (OFDMA) communication, the AP can allocate different respective sets of tones (referred to as resource units (RUs)) to the STAs for use in transmitting their UL data. In some cases, MU-MIMO can be combined with OFDMA. Specifically, the AP can allocate a same RU to multiple STAs and each of the multiple STAs may transmit via the same tones of the RU but via different respective orthogonal spatial streams.

Whether for an UL MU-MIMO or combined MU-MIMO and OFDMA transmission, when the AP receives the spatial streams, the AP combines the spatial streams and jointly demodulates and decodes the combined spatial streams as an UL MU PPDU. Because the AP is sensitive to power level deviations when decoding the spatial streams (which constitute the MU packet), the spatial streams transmitted by the respective STAs should be received at the AP at substantially similar power levels. Otherwise, when the power levels of the received spatial streams vary too much with respect to each other, the AP may not be able to decode the MU PPDU or the decoding may result in errors.

In some cases, one or more spatial streams of an UL MU-MIMO PPDU can be missing or unavailable, which can adversely affect the demodulation and decoding of the UL MU-MIMO PPDU. In some examples, a spatial stream may be considered unavailable for the UL MU-MIMO PPDU when a STA does not transmit the spatial stream or when the spatial stream transmitted by the STA is received by the AP at a power level that is below a threshold power level or otherwise not within a suitable received power range relative to the other spatial streams transmitted by the other STAs for the UL MU-MIMO PPDU. The unavailability of one or more spatial streams for the UL MU-MIMO PPDU can lead to power differences in the spatial streams of the UL MU-MIMO PPDU, which can contribute to errors in the reception or processing of the remaining spatial streams transmitted by the other STAs and, as a result, degrade demodulation or decoding performance and accuracy by the AP.

Various aspects described herein relate generally to detecting one or more spatial streams, of multiple spatial streams of an MU-MIMO packet (e.g., an UL MU-MIMO PPDU or combined UL MU-MIMO and OFDMA PPDU), that are unavailable, and processing (e.g., demodulating and decoding) remaining available spatial streams of the UL MU-MIMO packet based on the one or more spatial streams being unavailable. The receiver of the MU-MIMO packet (e.g., AP) can receive each of multiple spatial streams of the UL MU-MIMO packet using multiple receive chains. In some aspects, the receiver can estimate a respective channel associated with each spatial stream of the multiple spatial streams using each receive chain of the multiple receive chains. The receiver, as part of performing the channel estimation, can compute a power metric for each of the spatial streams, such as for each link in a spatial domain and one or both of a time or frequency domain (e.g., in a joint spatial-time/frequency domain). In some aspects, the receiver can determine that there is an unavailable spatial stream associated with a particular STA (for example, in instances in which the associated STA failed to transmit the spatial stream or transmitted the spatial stream at a power level that is insufficient to meet a minimum received power level at the receiver) based on the computed power metrics. For example, the receiver can determine that the spatial stream is unavailable based on determining that a power metric of a same spatial stream at each receive chain of the receiver is lower than a threshold. As another example, the receiver can identify a respective highest power metric for each individual spatial stream among the multiple receive chains and identify, from all received spatial streams, the received spatial stream that has the highest power metric. The receiver can then compare, to a threshold, a respective difference between the absolute highest power metric out of all of the spatial streams and the respective highest power metric of each spatial stream among the multiple receive chains. If the difference for a particular spatial stream exceeds the threshold, the receiver can determine that the spatial stream is unavailable.

Some aspects further relate to processing (e.g., demodulating and decoding) an UL MU-MIMO packet when one or more spatial streams are determined by a receiver to be unavailable. For example, in some aspects, the receiver can remove entries associated with one or more unavailable spatial streams from a phase tracking matrix. In some other aspects, the receiver can remove entries associated with one or more unavailable spatial streams from a pilot signal matrix. In some other aspects, the receiver can remove entries associated with one or more unavailable spatial streams from a demodulation matrix.

Particular implementations of the subject matter described in this disclosure can be implemented to realize one or more of the following potential advantages. In some implementations, the described techniques can be used to improve joint reception of an UL MU-MIMO packet. In some aspects, identification of unavailable spatial streams for an UL MU-MIMO packet can be used to improve receiver performance (e.g., performance of tracking and demodulation of the remaining available spatial streams) by removing or excluding information associated with the unavailable spatial streams for particular operations (e.g., removing entries associated with the unavailable streams from a phase tracking matrix, from a pilot signal matrix, or from a demodulation matrix). In some aspects, excluding entries associated with unavailable spatial streams reduces computational complexity and further improves accuracy of the receiver. For example, removing entries associated with one or more unavailable spatial streams from a phase tracking matrix improves calculations for phase and magnitude offsets of STAs associated with an UL MIMO packet. In some other aspects, the described techniques can enable the correction of phase and magnitude errors based on the unavailable spatial streams. Additionally or alternatively, by excluding unavailable spatial streams from processing operations, power level deviations between unavailable and available spatial streams don't affect demodulation and decoding performance.

Further details regarding aspects of the present disclosure are described below with respect to the figures. Aspects of the disclosure are initially described in the context of wireless communications systems. Additional aspects are described with respect to an UL MU-MIMO transmission and channel estimates for the UL MU-MIMO transmission. Examples are also described regarding unavailable spatial streams in an UL MU-MIMO transmission. Aspects of the disclosure are further described with respect to block diagrams and flowcharts that relate to detecting and correcting unavailable spatial streams in an UL MU-MIMO transmission.

FIG. 1 shows a block diagram of an example wireless communication network 100. According to some aspects, the wireless communication network 100 can be an example of a WLAN such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an AP 102 and multiple STAs 104. While only one AP 102 is shown, the WLAN 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, 33a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. After association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such aspects, while the STAs 104 may be capable of communicating with each other through the AP 102 using communication links 108, STAs 104 also can communicate directly with each other via direct wireless links 110. Two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and MAC layers. The APs 102 and STAs 104 transmit and receive wireless communications (hereinafter also referred to as "Wi-Fi communications") to and from one another in the form of PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
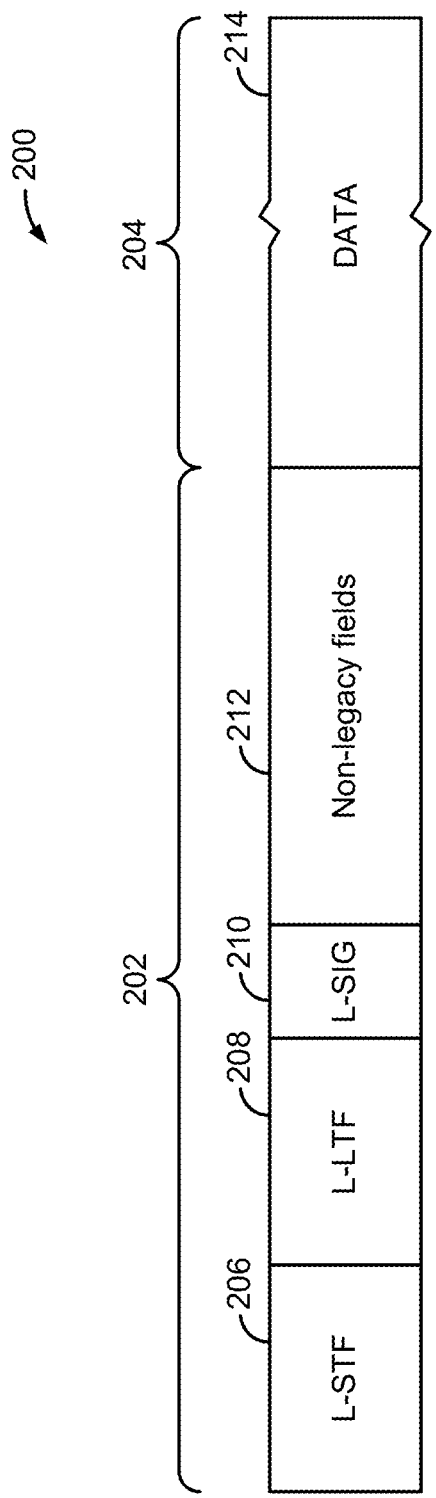
FIG. 2A shows an example protocol data unit (PDU) usable for communications between an access point (AP) and one or more stations (STAs), in accordance with some examples.

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two binary phase shift keying (BPSK) symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a BPSK modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 2B:
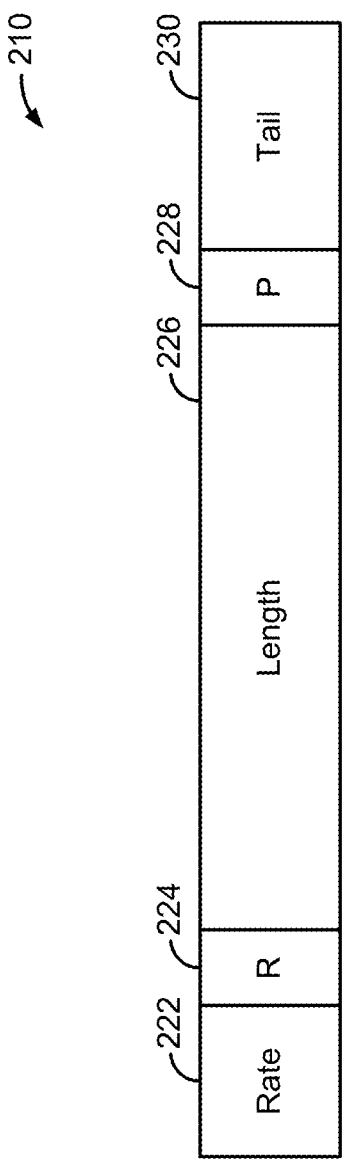
FIG. 2B shows an example field in the PDU of FIG. 2A, in accordance with some examples.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3A:
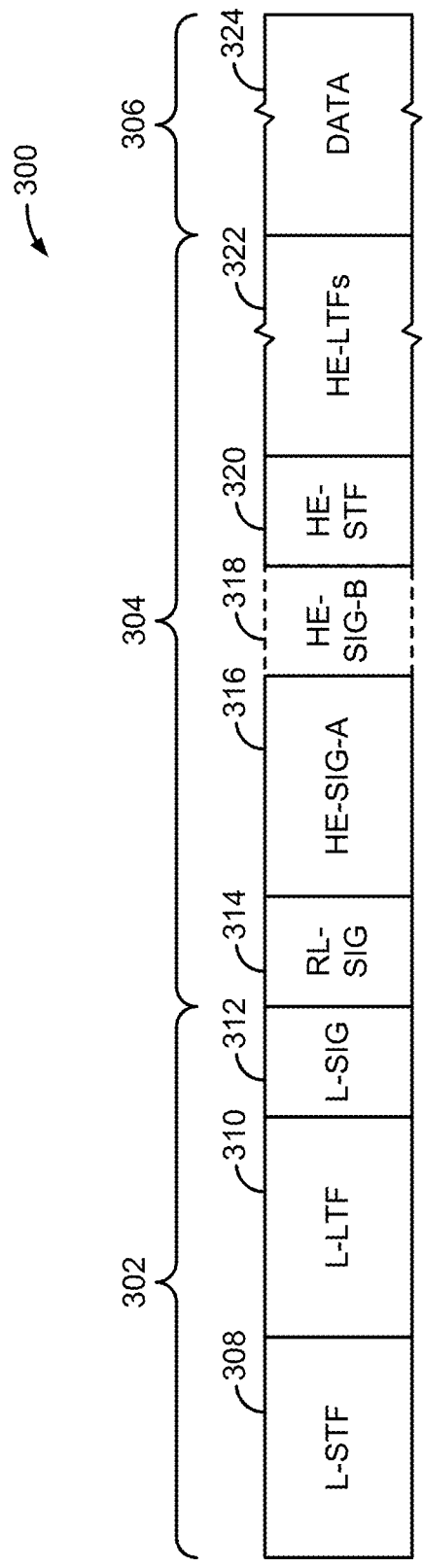
FIG. 3A shows an example physical (PHY) layer convergence protocol (PLCP) protocol data unit (PPDU) usable for communications between an AP and one or more STAs, in accordance with some examples.

FIG. 3A shows an example PPDU 300 usable for wireless communication between an AP and one or more STAs. The PPDU 300 may be used for SU, OFDMA or MU-MIMO transmissions. The PPDU 300 may be formatted as a High Efficiency (HE) WLAN PPDU in accordance with the IEEE 802.11ax amendment to the IEEE 802.11 wireless communication protocol standard. The PPDU 300 includes a PHY preamble including a legacy portion 302 and a non-legacy portion 304. The PPDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. HE-STF 320 may be used for timing and frequency tracking and AGC, and HE-LTF 322 may be used for more refined channel estimation. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PPDU 300 is an HE PPDU. An AP 102 may use HE-SIG-A 316 to identify and inform multiple STAs 104 that the AP has scheduled UL or downlink (DL) resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific resource unit (RU) allocation information. In the context of DL MU-OFDMA, such information enables the respective STAs 104 to identify and decode corresponding RUs in the associated data field 324. Each HE-SIG-B 318 includes a common field and at least one STA-specific field. The common field can indicate RU allocations to multiple STAs 104 including RU) assignments in the frequency domain, indicate which RUs are allocated for MU-MIMO transmissions and which RUs correspond to MU-OFDMA transmissions, and the number of users in allocations, among other examples. The common field may be encoded with common bits, cyclic redundancy check (CRC) bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
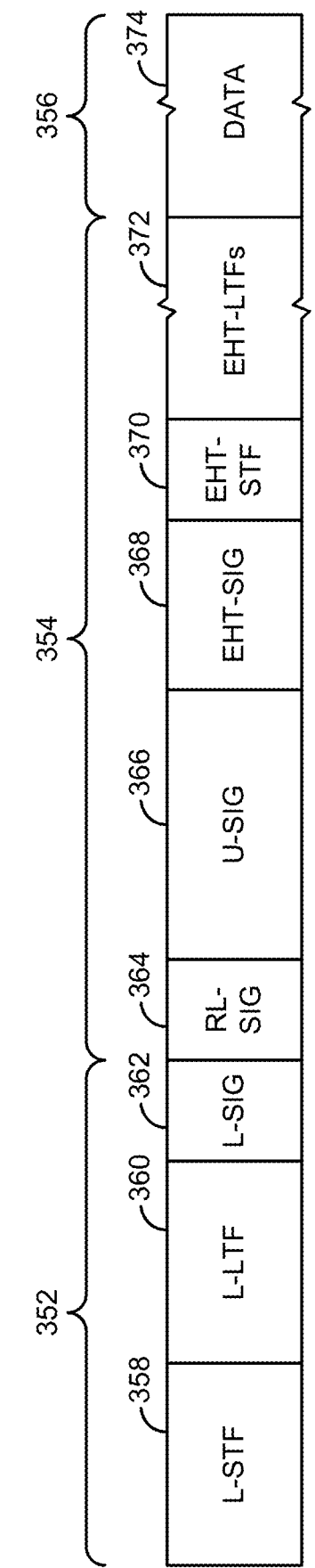
FIG. 3B shows another example PPDU usable for communications between an AP and one or more STAs, in accordance with some examples.

FIG. 3B shows another example PPDU 350 usable for wireless communication between an AP and one or more STAs. The PPDU 350 may be used for SU, OFDMA or MU-MIMO transmissions. The PPDU 350 may be formatted as an extremely high throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation. Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a CRC (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it waits for a particular time and then contend for access to the wireless medium. In some aspects, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that elapses before the wireless communication device may contend for access even in the absence of a detected symbol or even if the detected energy is below the relevant threshold.

As described above, the DCF is implemented through the use of time intervals. These time intervals include the slot time (or "slot interval") and the inter-frame space (IFS). The slot time is the basic unit of timing and may be determined based on one or more of a transmit-receive turnaround time, a channel sensing time, a propagation delay and a MAC processing time. Measurements for channel sensing are performed for each slot. All transmissions may begin at slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be).

When the NAV reaches 0, the wireless communication device performs the physical carrier sensing. If the channel remains idle for the appropriate IFS (for example, the DIFS), the wireless communication device initiates a backoff timer, which represents a duration of time that the device senses the medium to be idle before it is permitted to transmit. The backoff timer is decremented by one slot each time the medium is sensed to be idle during a corresponding slot interval. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of the numbers that may be randomly selected for the backoff timer is referred to as the contention window (CW). If, when the backoff timer expires, the wireless communication device transmits the PPDU, but the medium is still busy, there may be a collision. If there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may then increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, then proceed to initiate the new backoff timer. There are different CW and TXOP durations for each of the four access categories (ACs): voice (AC_VO), video (AC_VI), background (AC_BK), and best effort (AC_BE). The different durations and access categories enable particular types of traffic to be prioritized in the network.

Some APs and STAs may be configured to implement spatial reuse techniques. For example, APs and STAs configured for communications using IEEE 802.11ax or 802.11be may be configured with a BSS color. APs associated with different BSSs may be associated with different BSS colors. If an AP or a STA detects a wireless packet from another wireless communication device while contending for access, the AP or STA may apply different contention parameters based on whether the wireless packet is transmitted by, or transmitted to, another wireless communication device within its BSS or from a wireless communication device from an overlapping BSS (OBSS), as determined by a BSS color indication in a preamble of the wireless packet. For example, if the BSS color associated with the wireless packet is the same as the BSS color of the AP or STA, the AP or STA may use a first RSSI detection threshold when performing a CCA on the wireless channel. However, if the BSS color associated with the wireless packet is different than the BSS color of the AP or STA, the AP or STA may use a second RSSI detection threshold in lieu of using the first RSSI detection threshold when performing the CCA on the wireless channel, the second RSSI detection threshold being greater than the first RSSI detection threshold. In this way, the requirements for winning contention are relaxed when interfering transmissions are associated with an OBSS.

Figure 4:
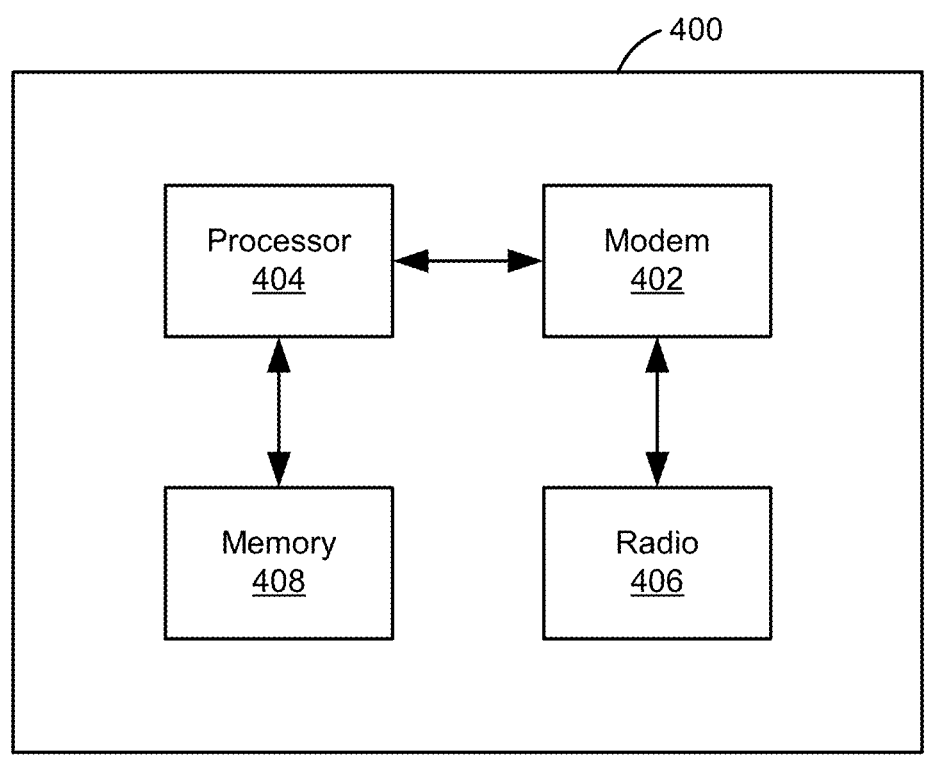
FIG. 4 shows a block diagram of an example wireless communication device, in accordance with some examples.

FIG. 4 shows a block diagram of an example wireless communication device 400. In some aspects, the wireless communication device 400 can be an example of a device for use in a STA such as one of the STAs 104 described above with reference to FIG. 1. In some aspects, the wireless communication device 400 can be an example of a device for use in an AP such as the AP 102 described above with reference to FIG. 1. The wireless communication device 400 is capable of transmitting and receiving wireless communications in the form of, for example, wireless packets. For example, the wireless communication device can be configured to transmit and receive packets in the form of PPDUs and MPDUs conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some aspects, the one or more modems 402 (collectively "the modem 402") additionally include a WWAN modem (for example, a 3GPP 4G LTE or 5G compliant modem). In some aspects, the wireless communication device 400 also includes one or more processors, processing blocks or processors 404 (collectively "the processor 404") coupled with the modem 402. In some aspects, the wireless communication device 400 additionally includes one or more radios 406 (collectively "the radio 406") coupled with the modem 402. In some aspects, the wireless communication device 400 further includes one or more memory blocks or elements (collectively "the memory 408") coupled with the processor 404 or the modem 402.

The modem 402 can include an intelligent hardware block or device such as, for example, an application-specific integrated circuit (ASIC), among other examples. The modem 402 is generally configured to implement a PHY layer, and in some implementations, also a portion of a MAC layer (for example, a hardware portion of the MAC layer). For example, the modem 402 is configured to modulate packets and to output the modulated packets to the radio 406 for transmission over the wireless medium. The modem 402 is similarly configured to obtain modulated packets received by the radio 406 and to demodulate the packets to provide demodulated packets. In addition to a modulator and a demodulator, the modem 402 may further include digital signal processing (DSP) circuitry, AGC circuitry, a coder, a decoder, a multiplexer and a demultiplexer. For example, while in a transmission mode, data obtained from the processor 404 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 406. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 406, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 404) for processing, evaluation or interpretation.

The radio 406 generally includes at least one RF transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas.

For example, in some aspects, the wireless communication device 400 can include, or be coupled with, multiple transmit antennas (each with a corresponding transmit chain) and multiple receive antennas (each with a corresponding receive chain). The symbols output from the modem 402 are provided to the radio 406, which then transmits the symbols via the coupled antennas. Similarly, symbols received via the antennas are obtained by the radio 406, which then provides the symbols to the modem 402.

The processor 404 can include an intelligent hardware block or device such as, for example, a processing core, a processing block, a central processing unit (CPU), a microprocessor, a microcontroller, a DSP, an ASIC, a programmable logic device (PLD) such as a field programmable gate array (FPGA), discrete gate or transistor logic, discrete hardware components, or any combination thereof designed to perform the functions described herein. The processor 404 processes information received through the radio 406 and the modem 402, and processes information to be output through the modem 402 and the radio 406 for transmission through the wireless medium. For example, the processor 404 may implement a control plane and at least a portion of a MAC layer configured to perform various operations related to the generation, transmission, reception and processing of MPDUs, frames or packets. In some aspects, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some aspects, the processor 404 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 404, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
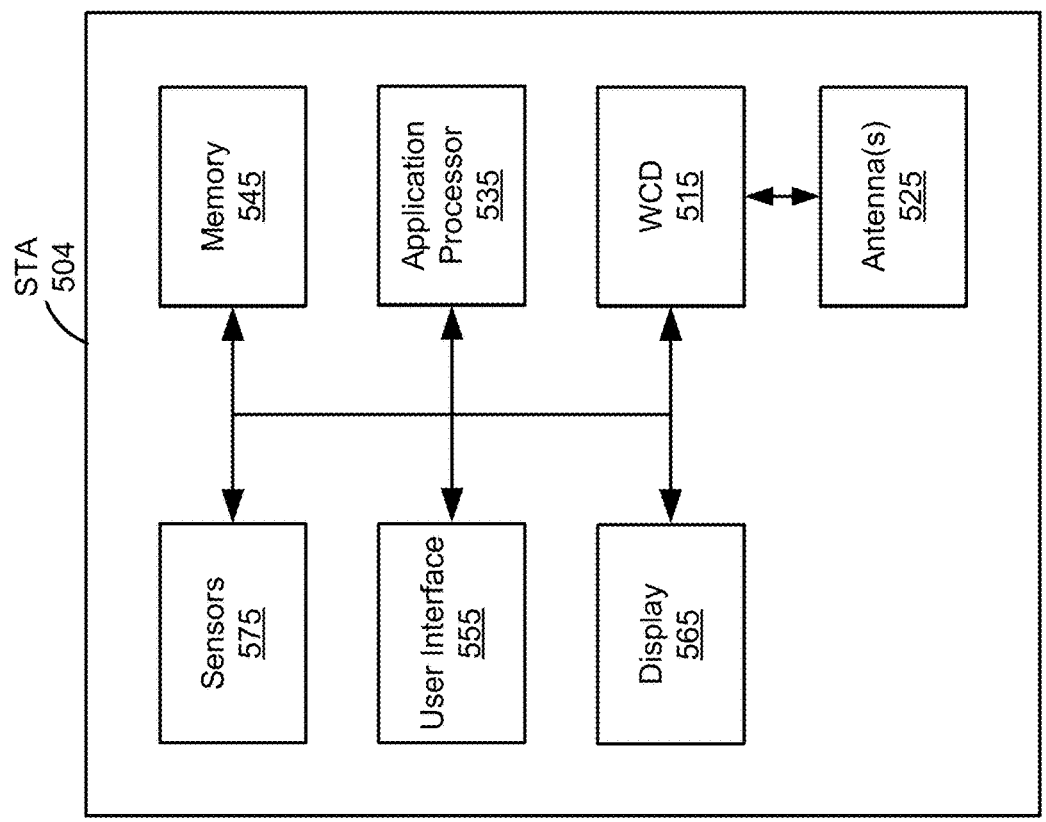
FIG. 5B shows a block diagram of an example STA, in accordance with some examples.
Figure 5A:
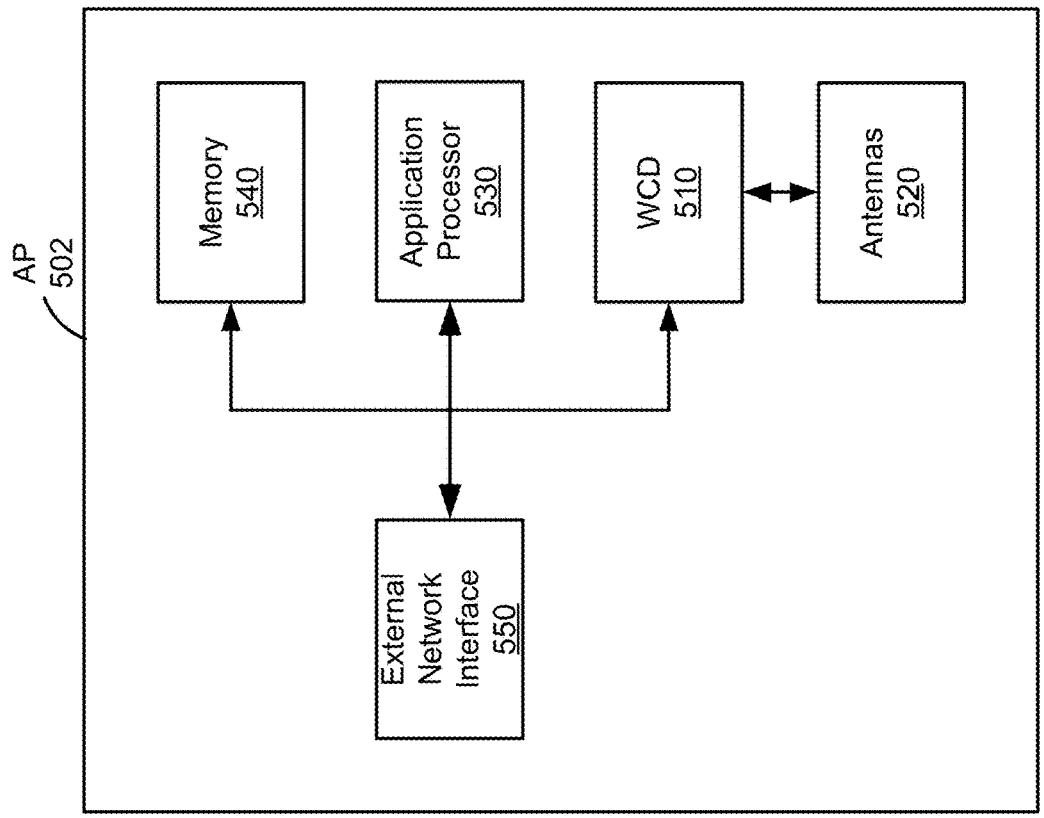
FIG. 5A shows a block diagram of an example AP, in accordance with some examples.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some aspects, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some aspects, the STA 504 further includes a user interface (UI) 555 (such as a touchscreen or keypad) and a display 565, which may be integrated with the UI 555 to form a touchscreen display. In some aspects, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, a frequency band, such as the 6.4 GHz, 5 GHz, or 6 GHz frequency bands, may have channels defined within the frequency band. These values describe a range of frequencies around the given frequency value which are part of the band identified by a specific frequency number. Each frequency band may have a uniform subchannel bandwidth, such as 20 MHz that is used to cover a total bandwidth associated with a given frequency band. As described above, some WLAN devices are capable of transmitting at higher bandwidths by concurrently using multiple subchannels (referred to as "channel bonding"), allowing the devices to use the subchannels efficiently with shared signaling overhead. By increasing the number of subchannels bonded into a channel, larger bandwidth channels (referred to as wide bandwidth channels) can be created. Such wide bandwidth channels can increase efficiency by limiting the signaling used and increasing the signaling efficiency of the frequency band. As channel bandwidth increases, the complexity of channel access and contention with other devices to use the channel can increase. Larger channel bandwidths can lead to complexities both with limits on transmission power and fairness in sharing access to frequency band resources between different devices, in addition to the basic issues with implementing structures to enable wide bandwidth channels.

In a MIMO communication link, received signals across different receive chains travel through different channel realizations from transmit antennas to a wireless communication device, such as an AP or STA. The transmit antennas can belong to a single user/device (and may or may not be co-located on a transceiver of the device) or may belong to entirely different users/devices.

According to aspects described herein, the wireless communication device can estimate a channel for one or more links or elements (e.g., every link or element) of a particular channel realization, which is referred to as a per-chain per-stream channel estimate. In some aspects, the wireless communication device can perform the channel estimation in the time domain or the frequency domain. The wireless communication device can use the per-chain per-stream channel estimate for each link or element for decoding the data streams for a single user/device or multiple users/devices. For example, in systems that operate according to 802.11 OFDM, a wireless channel is estimated with LTF sequences that are known to both the transmitter and the receiver. The wireless communication device can also track the channel using pilot sequences that are simultaneously transmitted with the data.

In some aspects, the wireless communication device can use per-chain per-stream channel estimate to classify channel properties, such as coherence bandwidth, coherence time, etc. For example, using the per-chain per-stream channel estimate, the wireless communication device can determine appropriate channel smoothing filters, any notching or de-weighting, and so forth.

According to aspects described herein, the wireless communication device can perform the channel estimation per-stream and per-chain (e.g., as described herein with respect to FIG. 8A-FIG. 8E) to independently evaluate each link in the spatial domain and the time or frequency domain (e.g., in a joint spatial-time/frequency domain). In some aspects, the wireless communication device can validate each link across the spatial domain and frequency/time domain rather than considering each link independently. The wireless communication device can perform the channel estimations in parallel or in sequence. The wireless communication device can independently perform the channel estimation of each spatial stream-receive chain combination (e.g., due to each link resulting from an independent channel realization). In some cases, the wireless communication device can perform the channel estimations concurrently in the time domain and the spatial domain (across each spatial stream-receive chain combination) or concurrently in the frequency domain and the spatial domain. While aspects are described herein with respect to multiple-input multiple-output (MIMO), the channel estimation and related techniques described herein can be applied similarly to multiple-input single-output (MISO), single-input multiple-output (SIMO), and single-input single-output (SISO) techniques.

By estimating each link across each stream and each receive chain, the wireless communication device can utilize the per-chain per-stream channel estimate (e.g., a joint spatial-time/frequency domain estimate) to make decisions related to receiver functionality of the wireless communication device. In some aspects, the wireless communication device can use the per-chain per-stream channel estimate to compute a single or several metrics for each MIMO channel link of the wireless communication device. For example, the wireless communication device can compute a metric using a frequency domain or a time domain power measurement for all channel elements based on the per-chain per-stream channel estimate. In some other aspects, the wireless communication device can determine a power metric based on accumulating OFDM tones in the frequency domain or accumulating time-domain samples and computing the corresponding power.

In some aspects, the wireless communication device can determine a channel estimate per-frequency domain tone or over a subset of tones, or over several windows of samples in the time domain to compute metrics (e.g., power metrics) per-channel link. In some other aspects, the metric is a byproduct of one or more self-correlation operations. In some other aspects, the wireless communication device can compute a metric (e.g., a power metric) from any other statistical metric operation, such as a geometric mean across tones in the frequency domain.

In some aspects, the wireless communication device may consider different characteristics such as receiver chain imbalances, different polarization, antenna specification, or analog gains to appropriately normalize the computed metric per-channel link. In some aspects, the characteristics can correspond to a frequency domain or time domain equivalent received signal strength indicator (RSSI) metric or by subtracting or adding overall total receive chain gain or overall combined RSSI measurement over all receive chains.

After a single metric or multiple metrics are computed per channel element, the wireless communication device can apply different processes to jointly assess the channel in the spatial domain and in the frequency or time domain and can use the metrics to improve receiver performance.

Figure 21:
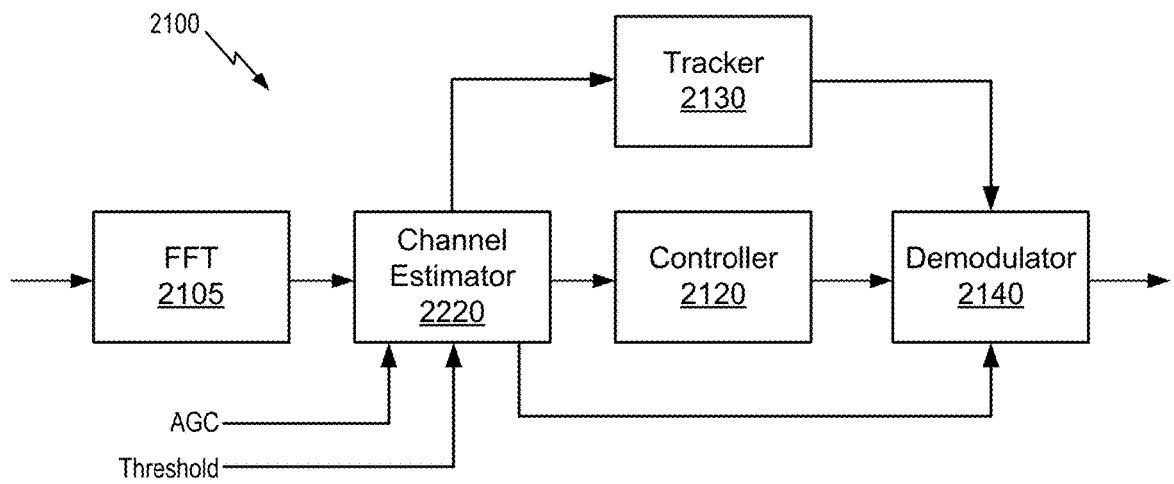
FIG. 21 shows a block diagram of a receiver of an AP that supports detecting and compensating for one or more unavailable spatial streams from a STA in an UL MU-MIMO PPDU in accordance with some examples.
Figure 22:
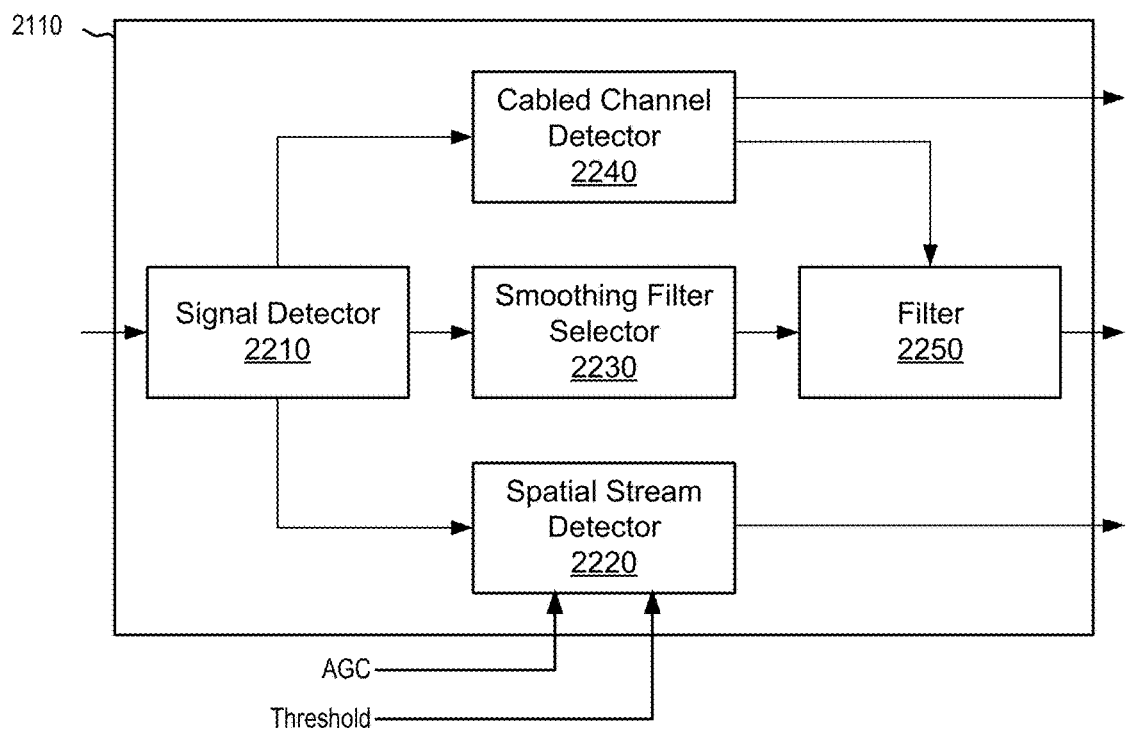
FIG. 22 shows a block diagram of a channel estimator that supports detecting and compensating for one or more unavailable spatial streams from a STA in an UL MU-MIMO PPDU in accordance with some examples.
Figure 23:
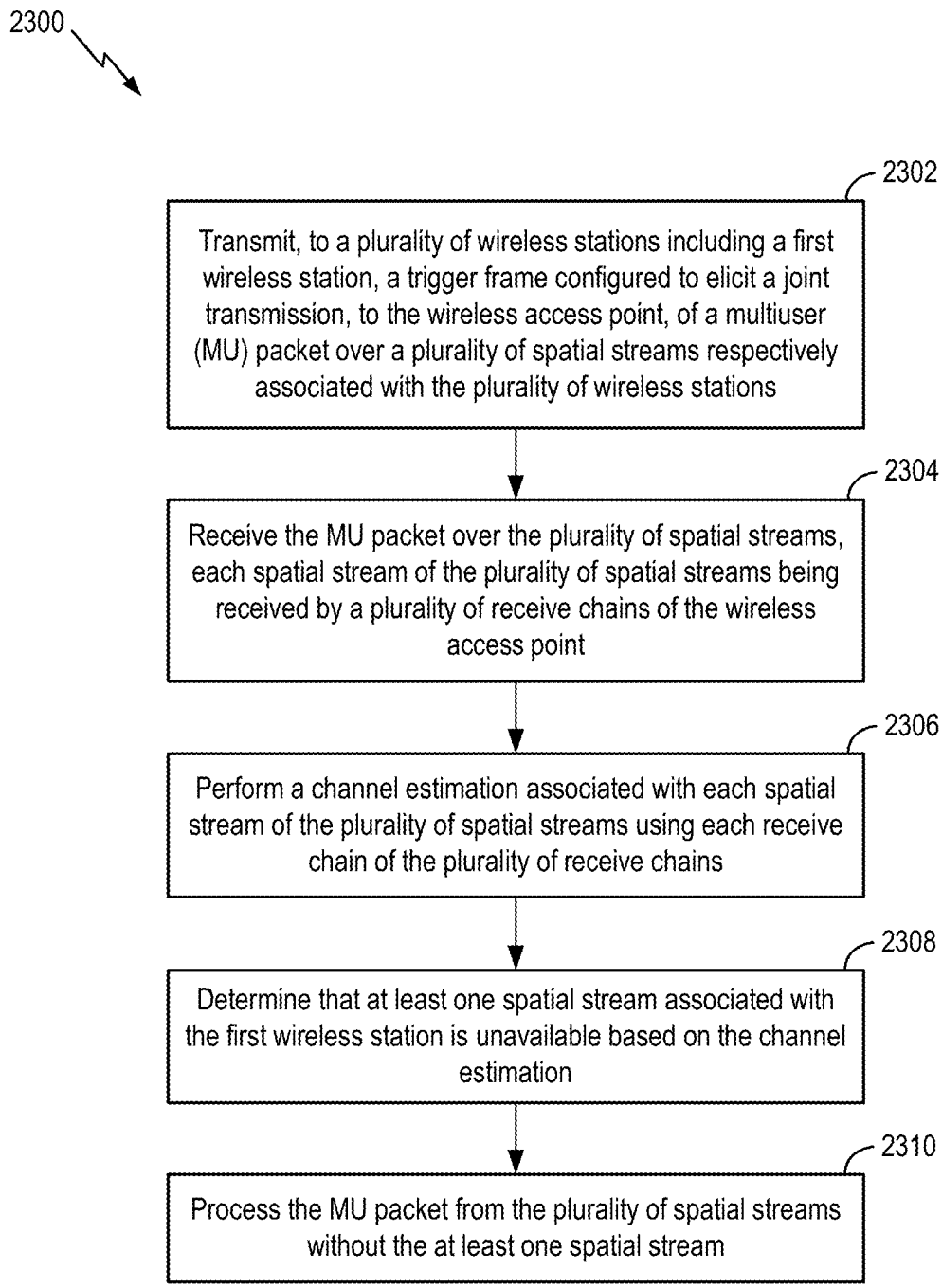
FIG. 23 shows a process, performed by a wireless communication device (for example, an AP), for wireless communication in accordance with some examples.

In some aspects, a joint channel estimation process can optimize subsequent receiver operations and enhance the communication link performance, including power consumption, receiver sensitivity improvement, throughput improvement, and security. A description of joint MIMO transmission is described below with respect to FIGS. 6A and 6B. A description of channel estimation process using the joint spatial-time/frequency metrics is described below in FIGS. 7 and 8A-8E and is followed by a description of detecting unavailable spatial streams in FIGS. 9 to 16. A disclosure related to selecting a smoothing filter for each spatial stream to improve receiver performance will follow in FIG. 17. A disclosure related to detecting active channel interference follows in FIG. 18. A disclosure related to selecting a demodulator based on the channel classification follows in FIG. 19. A disclosure related to classifying channels to improve receiver decoding follows in FIG. 20. The discussion then concludes with a brief description of example devices as illustrated in FIGS. 21 to 23.

Figure 6A:
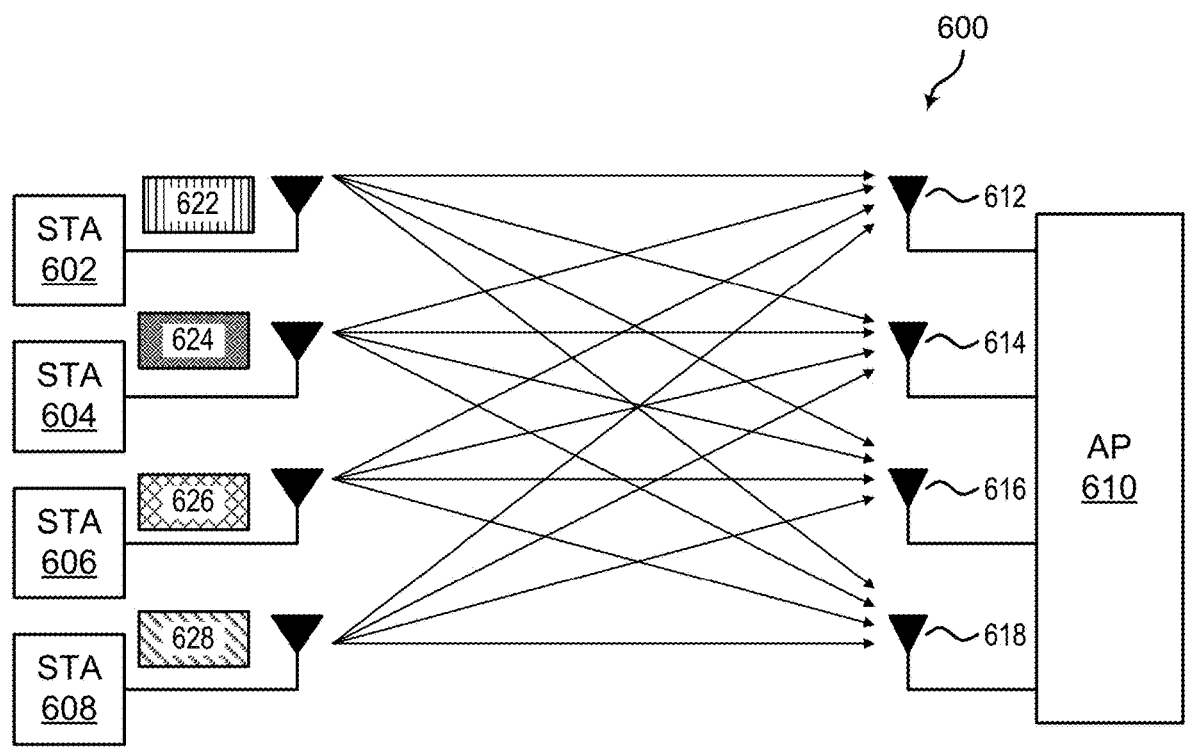
FIG. 6A shows a pictorial diagram of an example of a joint transmission of an uplink (UL) multiuser (MU) PPDU from multiple STAs in a wireless communication system, in accordance with some examples.

FIG. 6A shows a pictorial diagram of an example of a joint transmission of an UL MU-MIMO PPDU from multiple STAs in a wireless communication system 600. The UL MU-MIMO PPDU carries multiple PSDUs for one or more STAs using UL or DL MIMO techniques, OFDMA techniques, or a combination of MIMO and OFDMA techniques. The PPDU format may be in an HE, or EHT format.

In some aspects, the AP 610 can receive a buffer status report (BSR) and determine that each of the plurality of STAs 602, 604, 606, and 608 may have data buffered to be transmitted on the uplink to the AP 610. In that case, the AP 610 transmits a trigger frame that includes resource assignment to each of the plurality of STAs 602, 604, 606, and 608. In the example illustrated in FIG. 6A, the AP includes four different antennas (e.g., antenna 612, 614, 616, and 618) to receive the different spatial streams. In some aspects, the AP 610 can receive more spatial stream (e.g., eight or sixteen) based on the quantity of antennas and receive chains configured at the AP 610.

When the plurality of STAs 602, 604, 606, and 608 receive the trigger frame, each STA will determine its allocated resource, determine a transmission power based on the path loss to the AP and the MCS value, determine a time to transmit a PPDU associated with the UL MU-MIMO PPDU, and transmit a corresponding PPDU associated with the UL MU-MIMO PPDU in the allocated spatial stream.

For example, the STA 602 transmits a first PPDU in spatial stream 622, STA 604 transmits a second PPDU in spatial stream 624, STA 606 transmits a third PPDU in spatial stream 626, and STA 608 transmits a fourth PPDU in spatial stream 628. At the AP 610, each of the antennas 612, 614, 616, and 618 can receive each of the spatial streams 622, 624, 626, and 628 (e.g., the antenna 612 can receive the spatial streams 622, 624, 626, and 628, the antenna 614 can receive the spatial streams 622, 624, 626, and 628, and so on). Each receive antenna 612, 614, 616 and 618 of the AP 610 will receive electromagnetic energy associated with the spatial streams 622, 624, 626, and 628. In some aspects, each PPDU transmitted by the STAs 602, 604, 606, and 608 may have a training field (such as a long training field (LTF)) for channel measurements of all spatial streams. A plurality of receive chains (not shown) of the AP 610 receive the spatial streams from the receive antennas 612, 614, 616, and 618. The AP 610 jointly combines the PPDUs in the received spatial streams 622, 624, 626, and 628 (e.g., the first PPDU in spatial stream 622, the second PPDU in spatial stream 624, etc.) into a MU-MIMO PPDU and decodes the MU-MIMO PPDU.

Figure 6B:
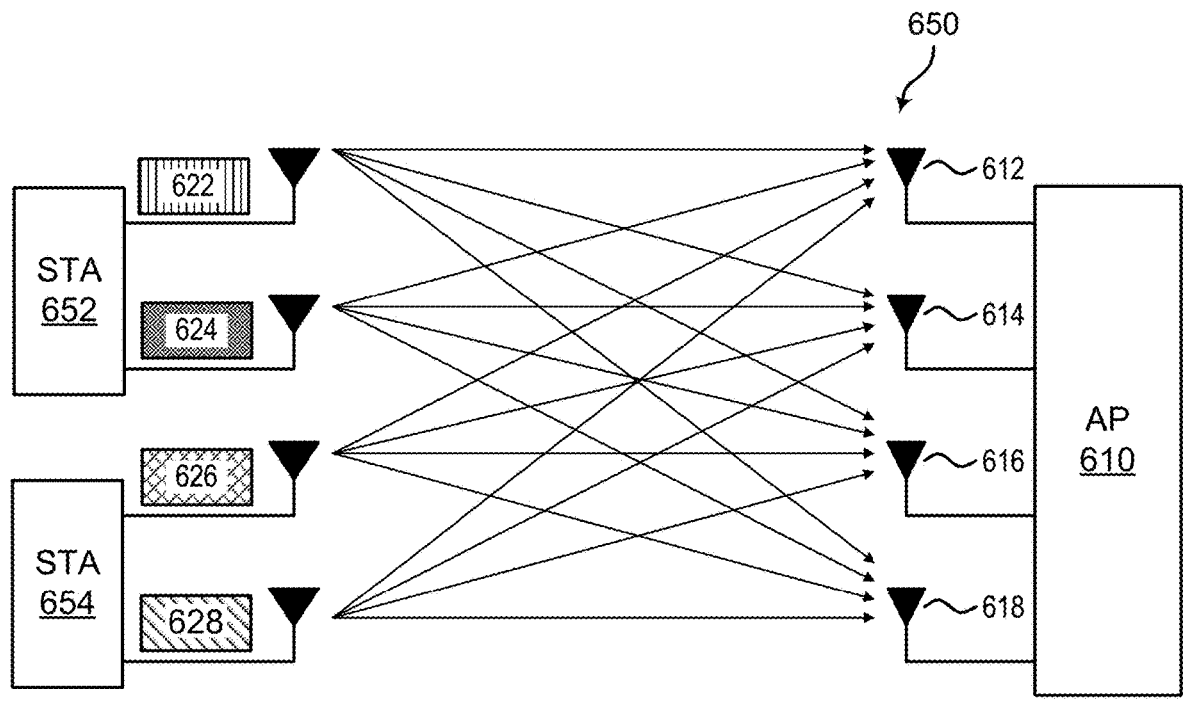
FIG. 6B shows a pictorial diagram of another example of a joint transmission of an UL MU-MIMO PPDU from multiple STAs in a wireless communication system, in accordance with some examples.

FIG. 6B shows a pictorial diagram of another example of a joint transmission of an UL MU-MIMO PPDU from multiple STAs in a wireless communication system 650. In some aspects, STA 652 and STA 654 may be configured to transmit multiple PPDUs in multiple spatial streams to the AP 610. For example, STA 652 may transmit a first PPDU in spatial stream 622 and a second PPDU in spatial stream 624 to the AP 610, and STA 654 may transmit a third PPDU in spatial stream 626 and a fourth PPDU in spatial stream 628 to the AP 610. The AP 610 jointly combines the PPDUs in the spatial streams 622, 624, 626, and 628 into a MU-MIMO PPDU and decodes the MU-MIMO PPDU. In some aspects, FIGS. 6A and 6B can be applied to DL techniques, or can be applied to other types of communication systems such as 5G NR, and so forth.

Figure 7:
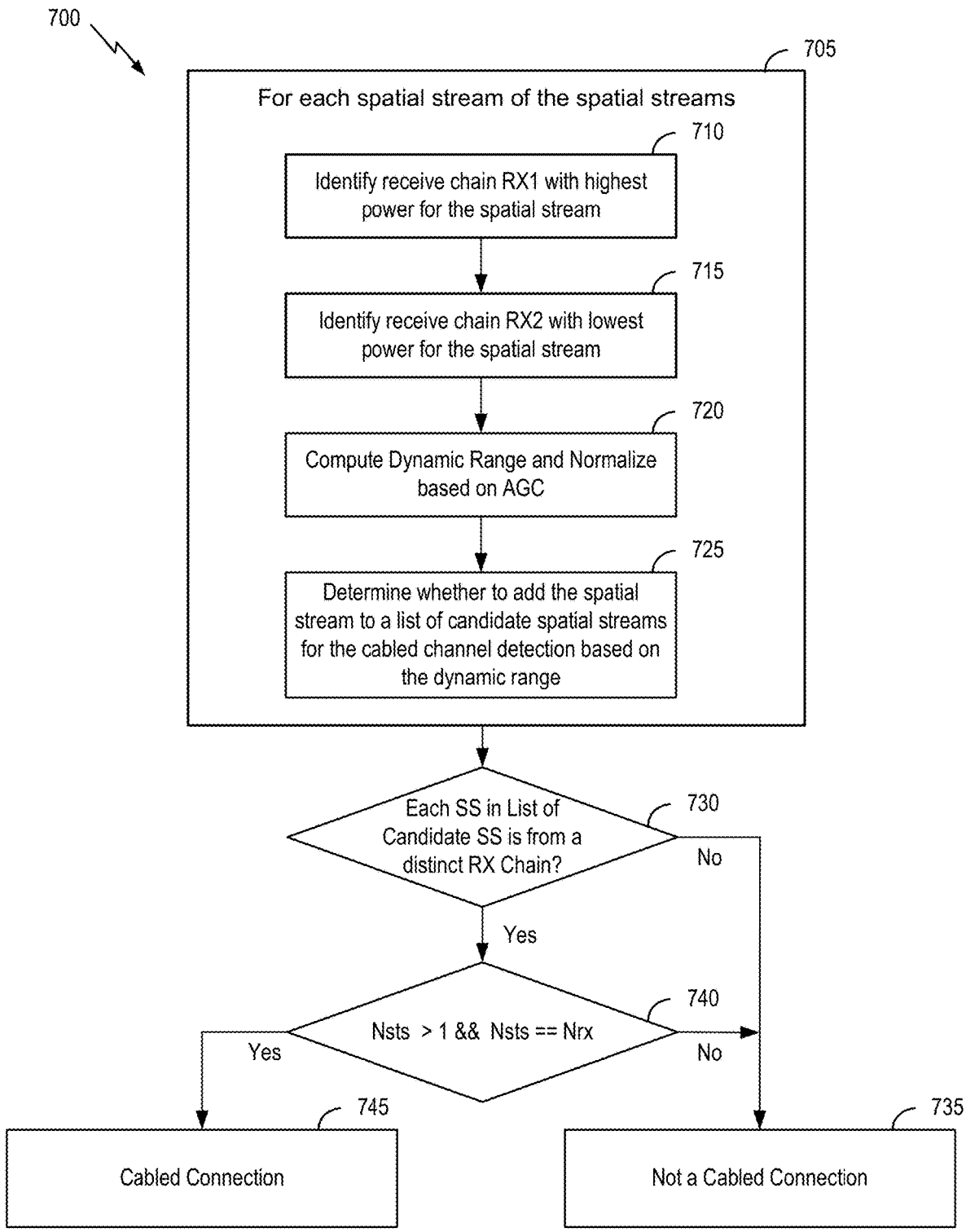
FIG. 7 shows a flowchart illustrating an example process, performed by an AP, for determining one or more power metrics from channel estimates of an UL MU-MIMO PPDU and for classifying a channel based on the one or more power metrics, in accordance with some examples.

FIG. 7 shows a flowchart illustrating an example process 700, performed by an AP, for determining one or more power metrics from channel estimates of an UL MU-MIMO PPDU and for classifying a channel based on the one or more power metrics, in accordance with some examples. In some cases, the example process 700 may be modified to classify different channel types, e.g., orthogonal but non-cabled channels, Butler channels, non-line of sight (NLOS) channels, etc. In other aspects, the example process 700 may be extended to a full channel classifier to incorporate different channels of interest and channel classification may be considered for appropriate and corresponding subsequent receiver operations.

At block 710, the process 700 iterates over each spatial stream and performs the operations enclosed within block 705 for each spatial stream of the AP. At block 710, the AP identifies a receive chain RX1 with a highest channel estimate for the spatial stream based on the joint channel estimation, such as that described herein with reference to FIGS. 8A to 8E. At block 715, the AP identifies a receive chain RX2 with a lowest channel estimate for the spatial stream.

At block 720, the AP may compute a dynamic range based on a difference between the highest channel estimate for the spatial stream and the lowest channel estimate for the spatial stream. In some aspects, the AP may normalize the dynamic range based on AGC information. At block 725, the AP may determine whether to add the spatial stream to a list of candidate spatial streams for the cabled channel detection based on the dynamic range. In some aspects, the dynamic range is compared to a threshold and an MCS threshold and added to the candidate spatial stream list.

In some aspects, the iteration of the spatial stream creates a list of candidate spatial streams. At block 730, the AP may determine whether each spatial stream in the list of candidate spatial streams is from a distinct receive chain. For example, if two spatial streams in the list of candidate spatial streams are identified from a first receive chain, then each spatial stream in the list of candidate spatial streams is not distinct. In the event that each spatial stream in the list of candidate spatial streams is not from a distinct receive chain, the spatial streams are not deemed to be a cabled connection at block 735.

In the event that each spatial stream in the list of candidate spatial streams is from a distinct receive chain, at block 740, the AP may determine whether the number of spatial streams is greater than one and the number of spatial streams is equal to the number of receive chains. If the number of spatial streams is greater than one and the number of spatial streams is equal to the number of receive chains, the AP may determine the connection is cabled connection at block 745. Otherwise, the AP may determine that the connection is not a cabled connection at block 735.

In some aspects, the process 700 builds a self-correlation matrix. The self-correlation matrix is represented by a matrix with each receive chain being represented on the X-axis and a spatial stream represented on the Y-axis. Correlation between chains or spatial streams can be identified by values in the same row or column with 1 indicating a correlation and 0 indicating no correlation. In the event of a cabled connection and the channel realization is coherent, each receive chain is correlated with a single stream and each stream is correlated with a single chain, as illustrated by the example in Equation 1 below.

$$\text{Correlation Matrix} = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad \text{(Equation 1)}$$

The example provided in Equation 1 is one illustrative example. Other examples are applicable to the techniques described herein, as long as each receive chain is correlated with a single stream and each stream is correlated with a single chain (e.g., there is a single "1" in each row or column and they are distinct such that no two rows can have 1 in the same column and no two columns can have 1 in the same row). The correlation matrix identifies relevant elements for the decoding process and can identify whether the channel realization is coherent. In this example, the cabled connection illustrated in Equation 1 identifies the receive chain corresponding to the stream and indicates the spatial stream at other receive chains represents noise and do not contribute signal to the spatial stream.

In some aspects, the example process 700 identifies an example of computing power metrics based on a dynamic range and normalization. Further, the example process 700 checks both the number of spatial streams and the number of receive chains to identify cabled connections from Butler, or other similar flat channels. For each stream, a normalized power metric is used to locate the receiver chain with a maximum and minimum power of that spatial stream.

FIGS. 8A-8E show a process for constructing a channel estimate array of an UL MU-MIMO PPDU on a per-chain and per-stream basis in accordance with some examples. In particular, FIGS. 8A-8E show a plurality of spatial streams (including a first spatial stream, a second spatial stream, a third spatial stream, and a third spatial stream) that are received by a wireless communication device, such as an access point. Each spatial stream is received by a plurality of receive chains of the wireless communication device (including a first receive chain, a second receive chain, a third receive chain, and a fourth receive chain). In particular, as shown in FIGS. 8A-8E, show that the first spatial stream is received by the first receive chain, the second receive chain, the third receive chain, and the fourth receive chain. Similarly, the second, third, and fourth spatial streams are each received by the first receive chain, the second receive chain, the third receive chain, and the fourth receive chain. Each spatial stream-receive chain combination in the array of FIGS. 8A-8E is referred to as a link element, including link element 801, link element 802, link element 803, through link element 816.

Figure 8A:
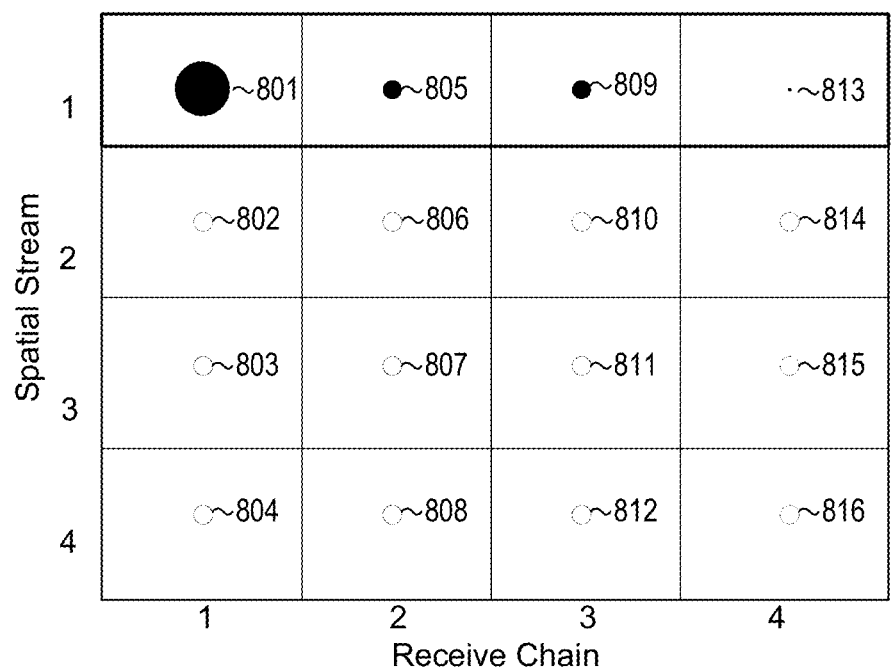
FIGS. 8A-8E show a process for constructing a channel estimate array of an UL MU-MIMO PPDU on a per-chain and per-stream basis in accordance with some examples.

As illustrated in FIG. 8A, the wireless communication device analyzes each link element from each receive chain for the first spatial stream. For example, the wireless communication device measures element 801 from the first receive chain and produces a power metric associated with the first spatial stream, which is illustrated with a filled circle. In FIGS. 8A-8E, the physical size of any spatial stream is approximate and may be exaggerated for illustrative purposes. After identifying the first spatial in element 801, the wireless communication device measures the next element 802 and determines that the element 802 does not contain the first spatial stream from the first receive chain, which thus is indicated by an unfilled circle. The wireless communication device continues this process for element 803 and element 804 from the first receive chain, which do not contain the first spatial stream.

After iterating over the elements associated with the first receive chain in FIG. 8A, the wireless communication device moves to elements associated with the second receive chain. In some aspects, the wireless communication device measures element 805 and produces a power metric associated with the first spatial stream. For example, the power metric of element 805 is less than the power metric of element 801, as illustrated by the smaller circle for element 805 as compared to the circle for element 801. The wireless communication device continues this process for each element and identifies that element 806, element 807, and element 808 from the second receive chain do not contain the first spatial stream. The wireless communication device further identifies that element 809 from the third receive chain includes the first spatial stream, that elements 810, 811, and 812 from the third receive chain do not include the first spatial stream, that element 813 from the fourth receive chain includes the first spatial stream, and that elements 814, 815, and 816 from the fourth receive chain do not include the first spatial stream.

During the measurement of the first spatial stream in FIG. 8A, the wireless communication device computes the maximum and minimum power metrics. In some aspects, the wireless communication device identifies element 801 as having the maximum power metric and element 813 as having the minimum power metric.

Figure 8B:
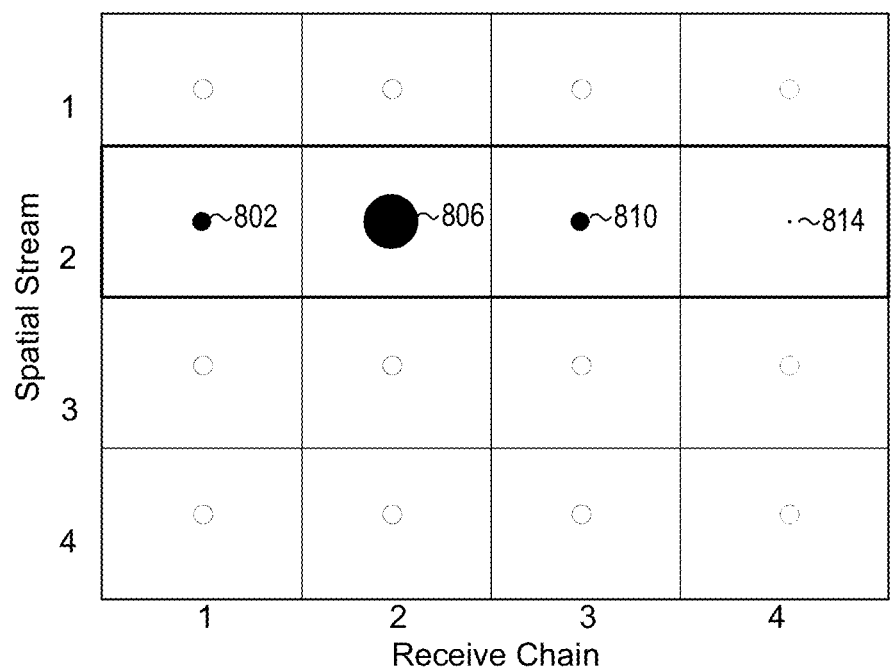
Figure 8C:
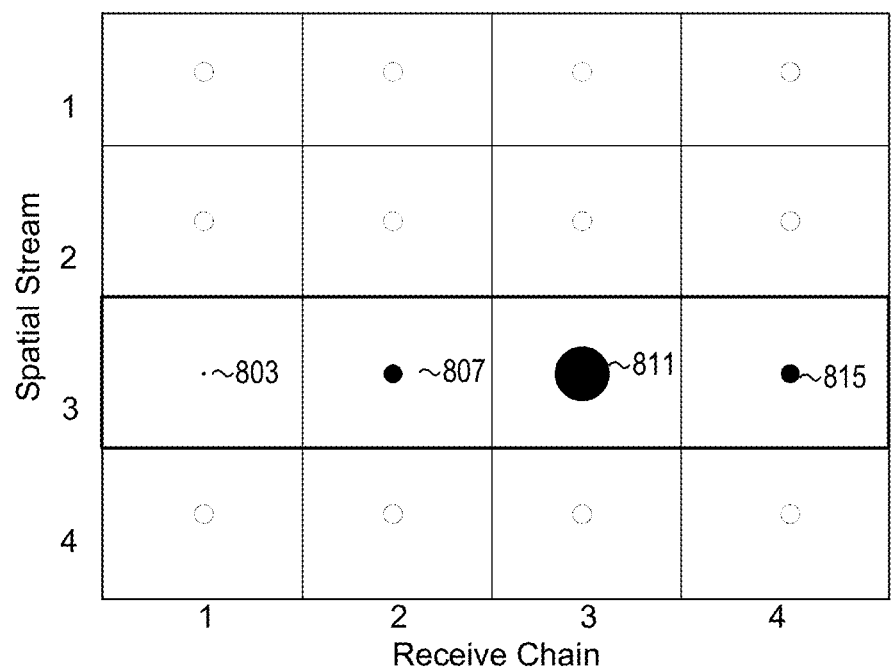
Figure 8D:
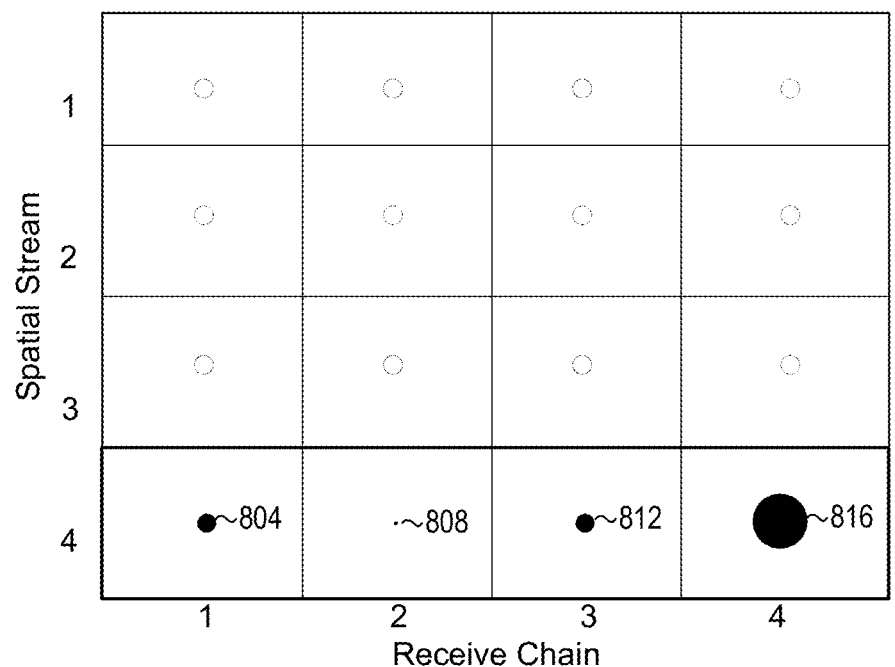

FIG. 8B illustrates a process for measuring the second spatial stream from each element. In this case, the wireless communication device identifies that element 806 has the maximum power metric and element 814 has the minimum power metric for the second spatial stream. FIG. 8C shows that element 811 has the maximum power metric and element 803 has the minimum power metric for the third spatial stream. FIG. 8D shows that element 816 has the maximum power metric and element 808 has the minimum power metric for the fourth spatial stream.

Figure 8E:
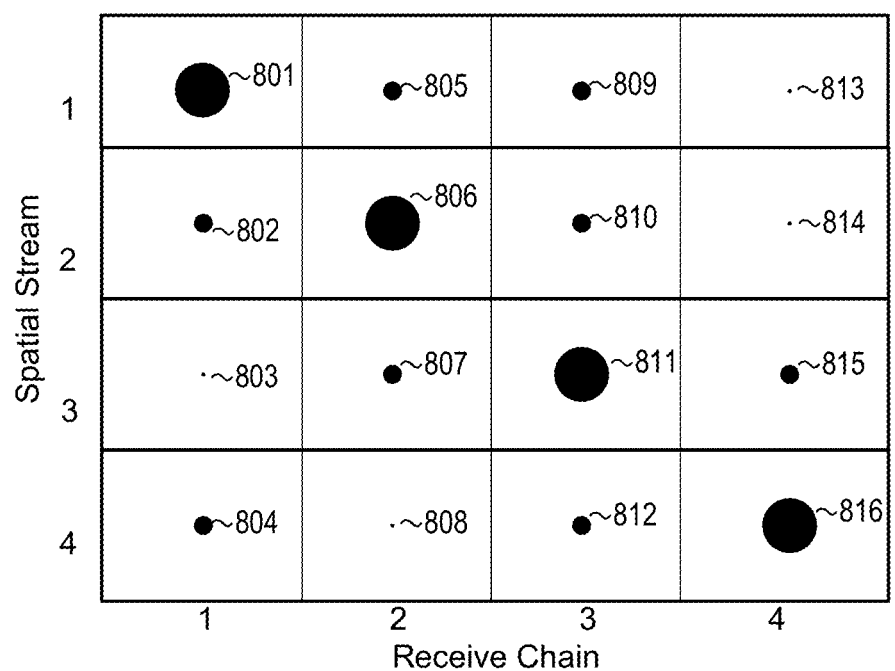

FIG. 8E shows the final measurements of each spatial stream from each receive chain and corresponding maximum and minimum values of each receive power metric. In particular, FIG. 8E illustrates a cabled connection because each channel is an orthogonal channel with dominant eigen modes that are equal to the number of active transmit chains and receive chains and correspond to the active connections between the transmit and the receive chains. The active connections illustrated by element 801, element 806, element 811, and element 816 have a wide coherence bandwidth compared to the transmitted signal and any other elements illustrated in FIG. 8E will not contribute to the spatial stream. In this case, the remaining elements are uncorrelated noise and do not contribute to decoding the underlying data transmission in the spatial stream.

Figure 9:
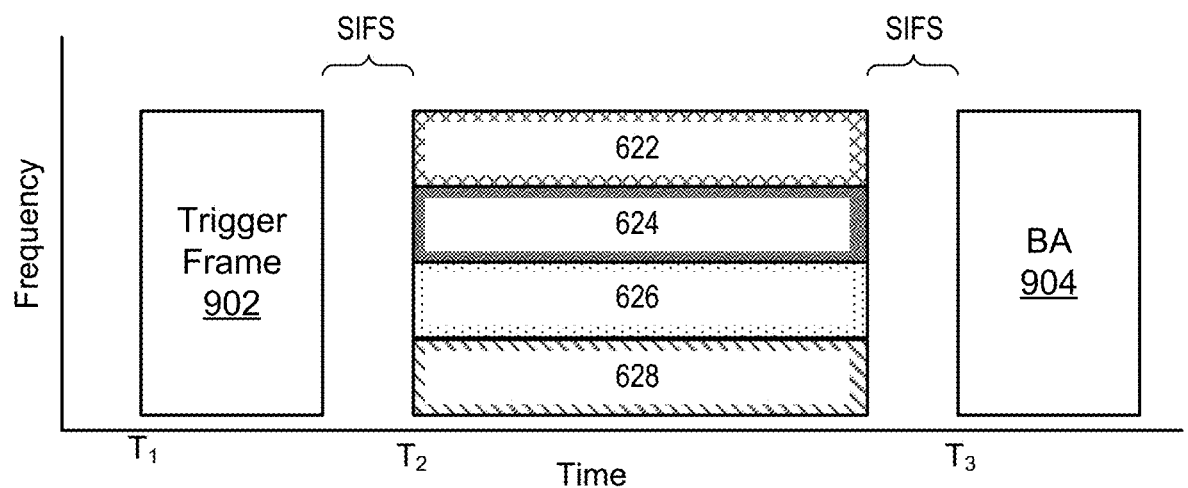
FIG. 9 shows a transmission sequence associated with transmission of an UL MU-MIMO PPDU in accordance with some examples.

FIG. 9 shows a transmission sequence associated with transmission of a MU-MIMO PPDU in accordance with some examples. Initially, at time $T_1$, the AP (e.g., the AP 610) transmits a trigger frame that instructs at least one STA to transmit a joint MU-MIMO PPDU. The trigger frame 902 specifies at least one spatial stream for transmission. In some cases, at least one spatial stream can be assigned to a single STA, or multiple spatial streams can be assigned to multiple STAs. In response, each STA may receive the trigger frame 902 and identify transmission resources for transmitting data on the uplink to the AP. For example, when a STA is transmitting an email with a large attachment, the STA may have more buffered data to transmit, and the AP may assign additional spatial streams to the STA to accommodate the large attachment. In other examples, multiple STAs may be involved in transmitting requests for network data, and each STA may be assigned at least one spatial stream. Spatial streams can also be assigned based on a service type and service requirements (e.g., a video call, a game, etc.).

In response to the trigger frame 902, each STA that is assigned resources may wait the duration of a SIFS and then transmit an assigned spatial stream at time $T_2$. For example, as illustrated in FIGS. 6A and 6B, STAs can be assigned to spatial streams 622, 624, 626, and 628 in various configurations. The AP receives each spatial stream, constructs a channel estimate, and demodulates the received data to construct the UL MU-MIMO PPDU. In particular, the AP constructs a matrix based on each spatial stream received by each receiver chain of the AP and attempts to demodulate and decode the received data. Equation 2 below illustrates a channel estimate matrix with a spatial stream represented on the X-axis of the matrix and a receive chain on the Y axis, thereby having 16 different channel estimates.

$$\text{Channel Estimates} = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \quad \text{(Equation 2)}$$

Using the channel estimates, the AP identifies the streams, demodulates the received symbols (e.g., from a QAM or a BPSK symbol) into raw data, and then decodes the UL MU-MIMO PPDU. Each STA should transmit their stream based on a path loss so that each received stream is within a suitable range at the AP. In some aspects, the suitable range is based on the modulation scheme because different modulation techniques are more sensitive to power deviations. For example, higher order QAM such as QAM-256 is more sensitive to power deviation than lower order modulation such as QAM-16 or BPSK. In the event a stream is received at a much lower power level, the stream will affect the demodulation and decoding of the MU-MIMO PPDU, which can cause errors in the decoding process of the UL MU-MIMO PPDU. The AP sends a block acknowledgement (BA) 904 after receiving and decoding the UL MU-MIMO PPDU.

Figure 10:
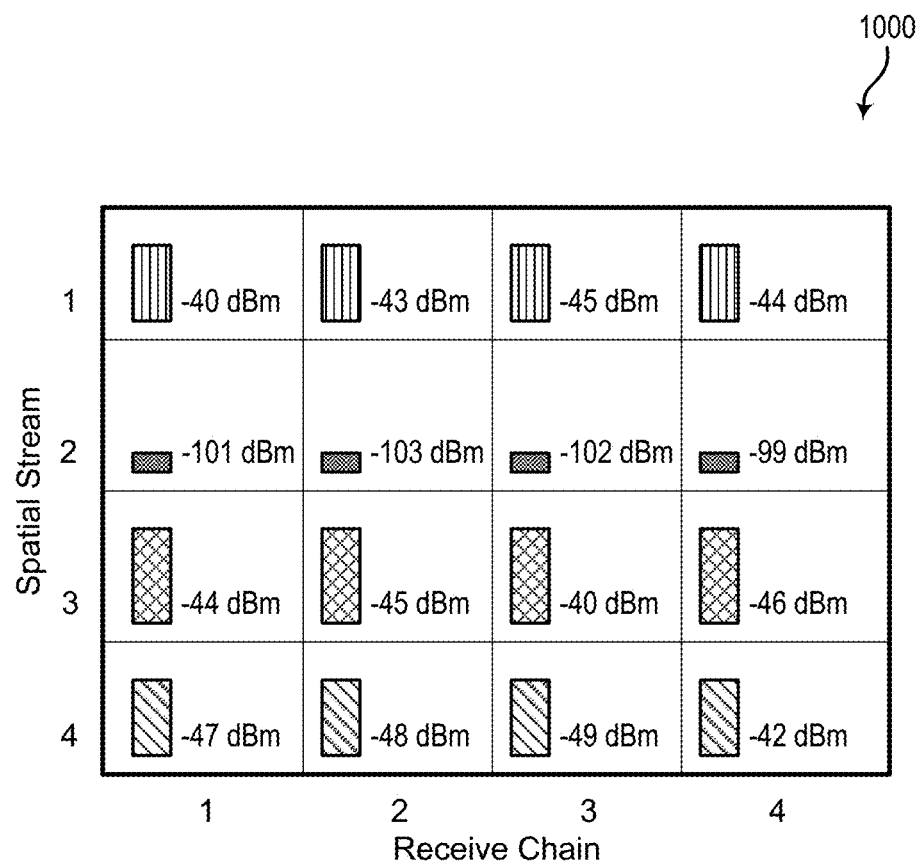
FIG. 10 shows a channel estimate array of an UL MU-MIMO PPDU on a per-chain and per-stream basis in accordance with some examples.

FIG. 10 illustrates a channel estimate array or matrix 1000 on a per-chain and per-stream basis in accordance with some examples. In some aspects, the power levels are measured for each chain and each spatial stream by measuring the LTF. In FIG. 10, spatial stream 1 is measured at each receive chain and has received signal strengths of −40 dBm at receive chain 1, −43 dBm at receive chain 2, −45 dBm at receive chain 3, and −44 dBm at receive chain 4. Spatial stream 2 is measured at each receive chain and has received signal strengths of −101 dBm at receive chain 1, −103 dBm at receive chain 2, −102 dBm at receive chain 3, and −99 dBm at receive chain 4. In this case, spatial stream 2 does not appear to have been transmitted (and is thus missing or unavailable) because the received power corresponds to the noise floor (e.g., is less than a noise floor threshold corresponding to the noise floor) and the noise will adversely affect demodulation of the other spatial streams in the UL MU-MIMO PPDU. For example, an AP may determine that a spatial stream associated with a STA was not transmitted by the STA based on determining that a respective power metric for the spatial stream is less than the noise floor threshold.

Figure 11A:
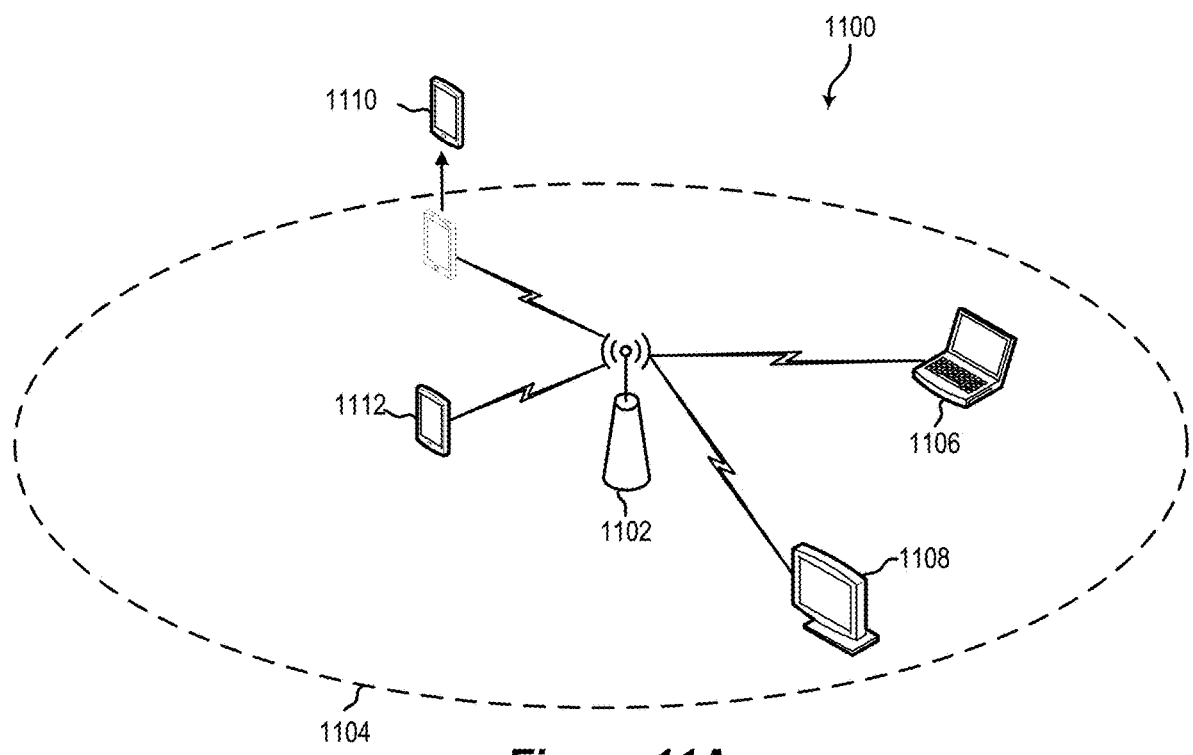
FIG. 11A shows an example of one or more spatial streams from a STA that are unavailable to an AP for an UL MU-MIMO PPDU based on the STA leaving a communication range of the AP in accordance with some examples.

FIG. 11A shows an example of one or more spatial streams from a STA that are unavailable to an AP for an UL MU-MIMO PPDU based on the STA leaving a communication range of the AP in accordance with some examples. In some aspects, the wireless communication system 1100 includes an AP 1102 that transmits and receives signals in a geographic area 1104 to a number of STAs 1106, 1108, 1110, and 1112. In some examples, the STA 1106 may be a laptop, the STA 1108 may be a television that is generally located in a fixed position, the STA 1110 may be a smartphone that is highly mobile, and the STA 1112 may also be a smartphone that is highly mobile.

In some aspects, the STA 1110 may be positioned within the geographic area and transmit a BSR to the AP 1102 at time $T_1$ to indicate that the STA 1110 has data to transmit on the uplink to the AP 1102. At time $T_2$, the STA 1110 may then leave the geographic area 1104 and cannot receive any signals from the AP 1102. When the AP 1102 transmits a trigger frame at time $T_3$ to the STA 1110, the STA 1110 will not receive the trigger frame. As a result of failing to receive the trigger frame, the STA 1110 will be unaware of any resource assignments and will not transmit on any spatial stream to the AP 1102.

Because the STA 1110 did not receive the trigger frame, the STA 1110 will not transmit the assigned spatial streams for the MU-MIMO PPDU to the AP 1102 in the context of the reception of the MU-MIMO PPDU. In such cases, the assigned spatial streams are considered unavailable or missing. When the AP 1102 attempts to construct the channel estimate or demodulate and decode the channel using a channel array or matrix (e.g., channel array 1000), noise based on the one or more spatial streams being unavailable can introduce errors. For example, the AP 1102 may encounter errors when attempting to jointly demodulate and decode the spatial stream of the MU-MIMO PPDU.

Figure 11B:
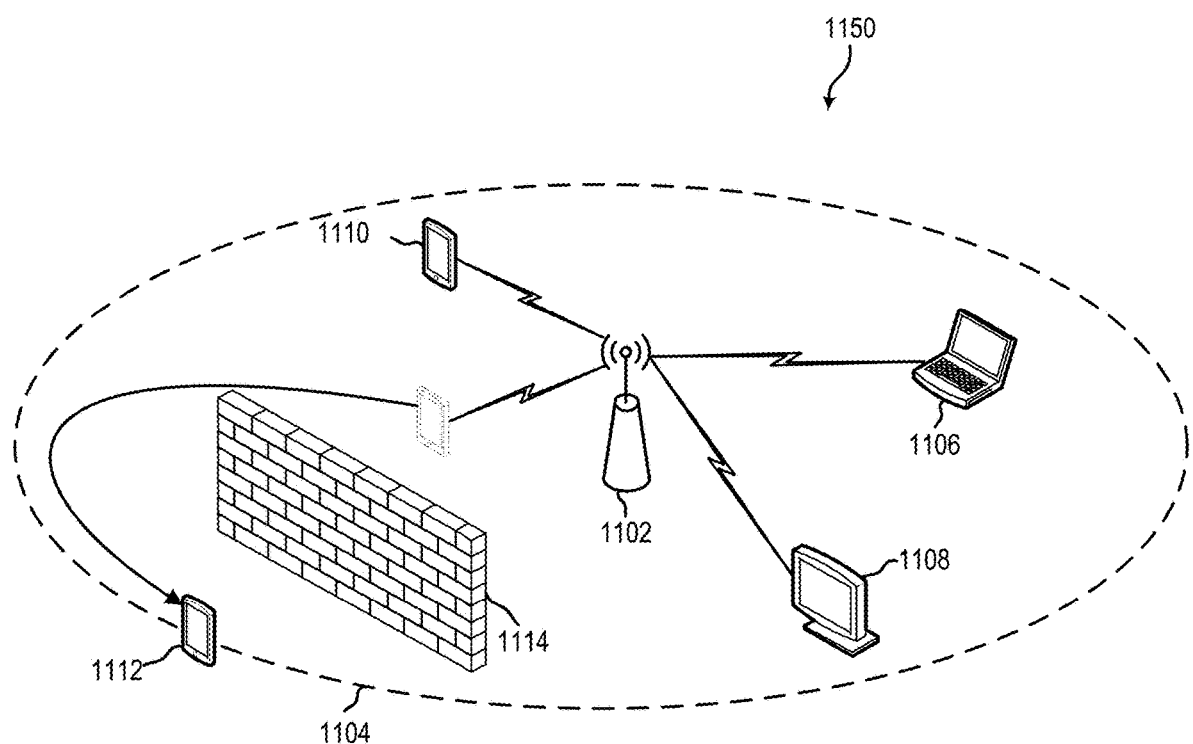
FIG. 11B shows another example of one or more spatial streams from a STA that are unavailable to an AP for an UL MU-MIMO PPDU based on an insufficient received power of the one or more unavailable spatial streams at the AP in accordance with some examples.

FIG. 11B shows another example of one or more spatial streams from a STA that are unavailable to an AP for an UL MU-MIMO PPDU based on an insufficient received power of the one or more unavailable spatial streams at the AP in accordance with some examples. In some aspects, a wireless communication system 1150 includes a STA 1112 that may be positioned within the geographic area and transmit a BSR to the AP at time $T_1$. In some aspects, the AP 1102 receives the BSR and determines and identifies the MCS of the transmission from STA 1112, the spatial streams assigned to the STA 1112, and a required power level for the assigned spatial streams. At time $T_2$, the STA may move within the geographic area 1104 and the AP 1102 transmits the trigger frame at time $T_3$. The trigger frame includes the MCS of the transmission from STA 1112, the spatial streams assigned to the STA 1112, and a required power level for the assigned spatial streams.

By time T3, the STA 1112 may be positioned within the geographic area 1104 to be behind an obstruction 1114 (e.g., a wall, etc.). In some examples, the obstruction may absorb signals transmitted by the STA 1112. The STA 1112 receives the trigger frame, measures the path loss from the trigger frame, and then determines a required transmission power to achieve the requested power level at the AP. In some cases, the required transmission power may be based on the MCS value determined for the STA 1112 by the AP 1102. In some aspects, the transmission power level of the power amplifier can be limited because the transmission power to achieve the required power level at the AP 1102 would exceed a regulatory limit. The STA 1112 may transmit the spatial stream at a maximum transmission power and, when received by the AP 1102, the spatial stream will be outside of a suitable range of the required power level.

In some other examples, the STA 1112 may be positioned at an edge of the geographic area 1104 and the transmission power level of the power amplifier can be limited because the transmission power to achieve the required power level at the AP 1102 would exceed a regulatory limit.

In some aspects, the STA 1112 may transmit different signals that have different path losses due to the frequency band, the material of the obstruction 1114, and so forth. For example, the path loss in the 5 GHz band is significantly larger than 2.4 GHz and a dense obstruction 1114 (e.g., a brick wall) may prevent the STA 1112 from transmitting at a sufficient power level in the 5 GHz band. In some aspects, the obstruction 1114 may not block the 2.4 GHz band to the same extent and the STA 1112 may be able to transmit and receive in the 2.4 GHz band. In some aspects, the STA 1112 may be able to transmit in the 5 GHz band due to the higher transmission power limits (e.g., 23 dBm) but not in the 2.4 GHz due to lower transmission power limits (e.g., 20 dBm).

In some aspects, the STA 1112 may receive the trigger frame but cannot achieve the desired power level requested by the AP 1102 for its assigned spatial streams. In such aspects, the AP 1102 will receive one or more spatial streams from the STA 1112 having a power level that is lower than other corresponding spatial streams. Because the spatial streams from the STA 1112 have lower power and are not within the suitable power range, when the AP 1102 demodulates the received streams, the MU-MIMO PPDU may include errors that can be detected by, for example, a CRC or an error correction code (ECC). In some examples, a spatial stream may be assigned a different MCS scheme that is sensitive to power levels (e.g., QAM-64) and the reduced power level of the reception stream may cause an LLR or a ML receiver to misidentify a symbol.

When the AP 1102 attempts to demodulate and decode the data using the channel matrix, errors in the demodulating and decoding process may be introduced based on the one or more unavailable spatial streams associated with the STA 1112.

In some aspects, the demodulation and decoding errors may propagate to other aspects of the AP 1102. For instance, the AP 1102 may include a phase tracking function based on the received spatial streams not being perfectly aligned in time due to clock variation and other minor imperfections. In some examples, each STA may have minor timing differences that affect receiver performance of the AP 1102. In some other aspects, the AP 1102 may generate a demodulation matrix based on the received spatial streams. The AP may remove certain entries of the demodulation matrix in some cases. For instance, when a channel estimate matrix (e.g., the channel estimate matrix of Equation 1) includes unusable values associated with one or more unavailable spatial streams from a STA, the demodulation process may introduce errors.

Figure 12:
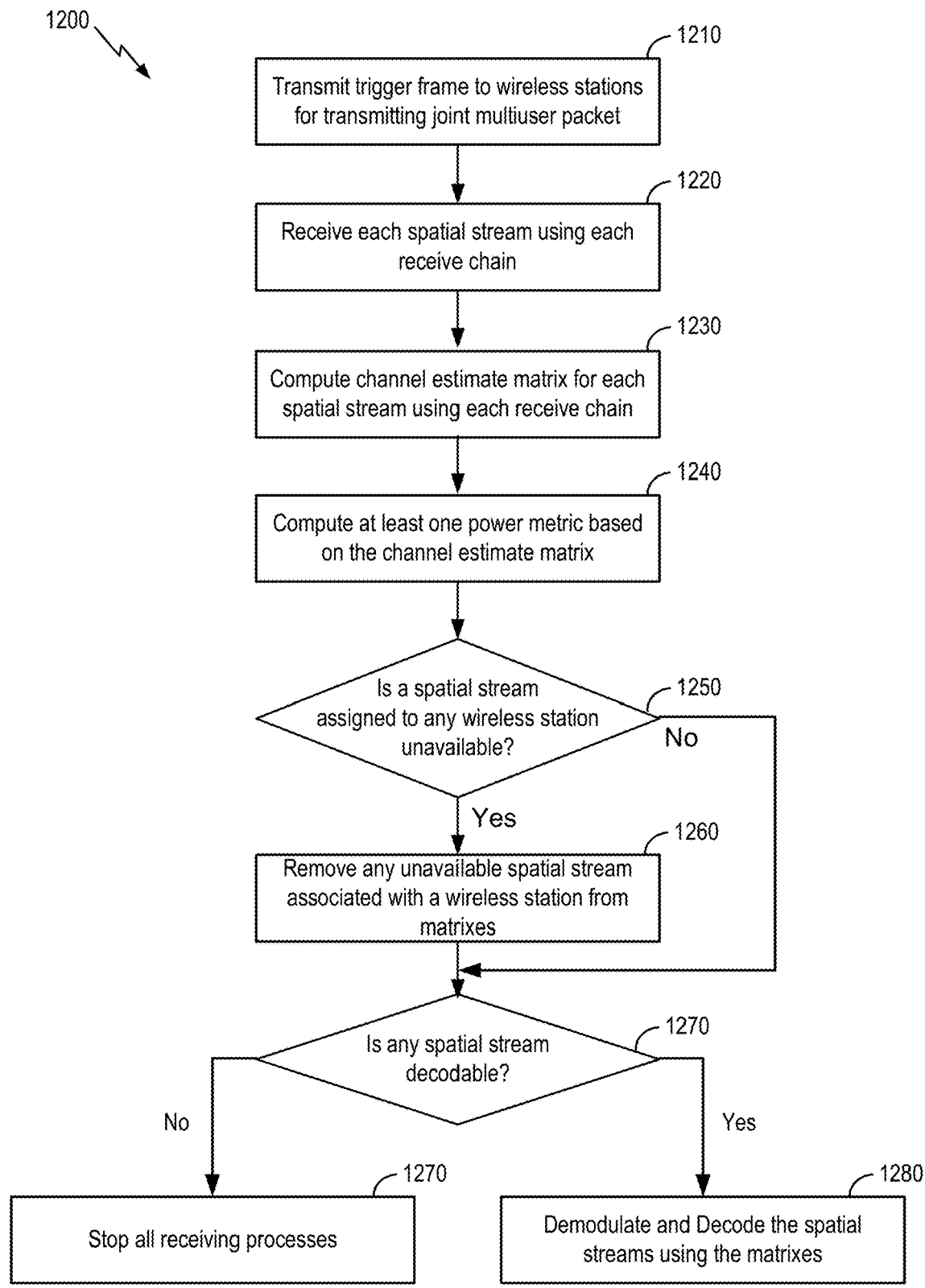
FIG. 12 shows a flowchart illustrating an example process, performed by an AP, for identifying one or more spatial streams that are unavailable to the AP for an UL MU-MIMO PPDU based on channel estimates of spatial streams associated with the UL MU-MIMO PPDU in accordance with some examples.

FIG. 12 shows a flowchart illustrating an example process, performed by an AP, for identifying one or more spatial streams that are unavailable to the AP for an UL MU-MIMO PPDU STA based on channel estimates of spatial streams associated with the UL MU-MIMO PPDU in accordance with some examples. In some aspects, an example process 1200 can be performed by an AP. In some other aspects, the process 1200 can be implemented by different devices based on the configuration of the communication service and the devices. For example, a user device in a 5G NR could implement some of the described processes herein with respect to carrier aggregation for multiple next generation Node Bs (gNBs).

In some aspects, the AP may have previously received multiple BSRs from a plurality of STAs that have data to transmit on the uplink to the AP. The AP determines that the plurality of STAs are capable of transmitting an UL MU-MIMO PPDU and identifies and assigns resources for the plurality of STAs. In some aspects, the AP may identify a single STA with buffered data via the BSR and assign a plurality of spatial streams to the STA.

At block 1210, the AP transmits a trigger frame to the STAs and includes spatial stream assignments, required power level at the AP, and MCS assignment information for each STA or each spatial stream. At block 1220, the AP receives each spatial stream using each receive chain. For example, in the event the AP includes four receive chains and receives four assigned spatial streams, the AP receives sixteen paths.

At block 1230, the AP computes a channel estimate matrix for each spatial stream using each receive chain. In some aspects, the AP attempts to measure a training field (e.g., an EHT-LTF, HE-LTF, etc.) that contains a known sequence of tones in the OFDMA system. In some cases, the channel estimation can be performed in the frequency domain based on a tone-by-tone frequency response estimation. In some cases, the channel estimation can be performed in the time domain based on a channel impulse response estimation. In the example of an AP with four receive chains and four assigned spatial streams, the AP may generate a matrix including the sixteen different channel estimates.

At block 1240, the AP computes at least one power metric based on the channel estimate matrix. In some aspects of block 1240, the AP may compute at least one power metric to facilitate demodulation and decoding of the spatial stream. In some aspects, the AP can compute a power for each spatial stream (e.g., a dynamic range), a power metric for each receiver chain, a power metric for each channel estimate, or a single power metric. For example, the single power metric may be an average value that could identify a noise floor, which may be used in a threshold value.

At block 1250, the AP determines if a spatial stream assigned to any STA is unavailable based on the power metric computed in block 1240. In some aspects, when a spatial stream is not transmitted, the channel estimate of the spatial stream will appear as noise (e.g., −100 dBm). Different methods of determination whether a spatial stream is unavailable is discussed herein with reference to FIG. 12, FIG. 13, and FIG. 14.

If the AP determines that a spatial stream is unavailable at block 1250, the AP removes any spatial stream associated with the STA from the matrixes that are used for the receiving of the UL MU-MIMO PPDU (e.g., a demodulation matrix, a pilot tone matrix, etc.).

After removing the spatial streams at block 1260 or after determining that a spatial stream is not unavailable at block 1250, the AP determines if any spatial stream is decodable at block 1270. In some aspects, if all spatial streams are unavailable, the AP may determine that there are no decodable spatial streams and may then stop all receiving processes at block 1270. If the AP determines that there is at least one decodable spatial stream, the AP demodulates and decodes the spatial streams at block 1280. In some aspects, if a spatial stream is unavailable and matrix values are removed at block 1260, the demodulation and decoding of the spatial streams is performed without the unavailable spatial streams.

Figure 13:
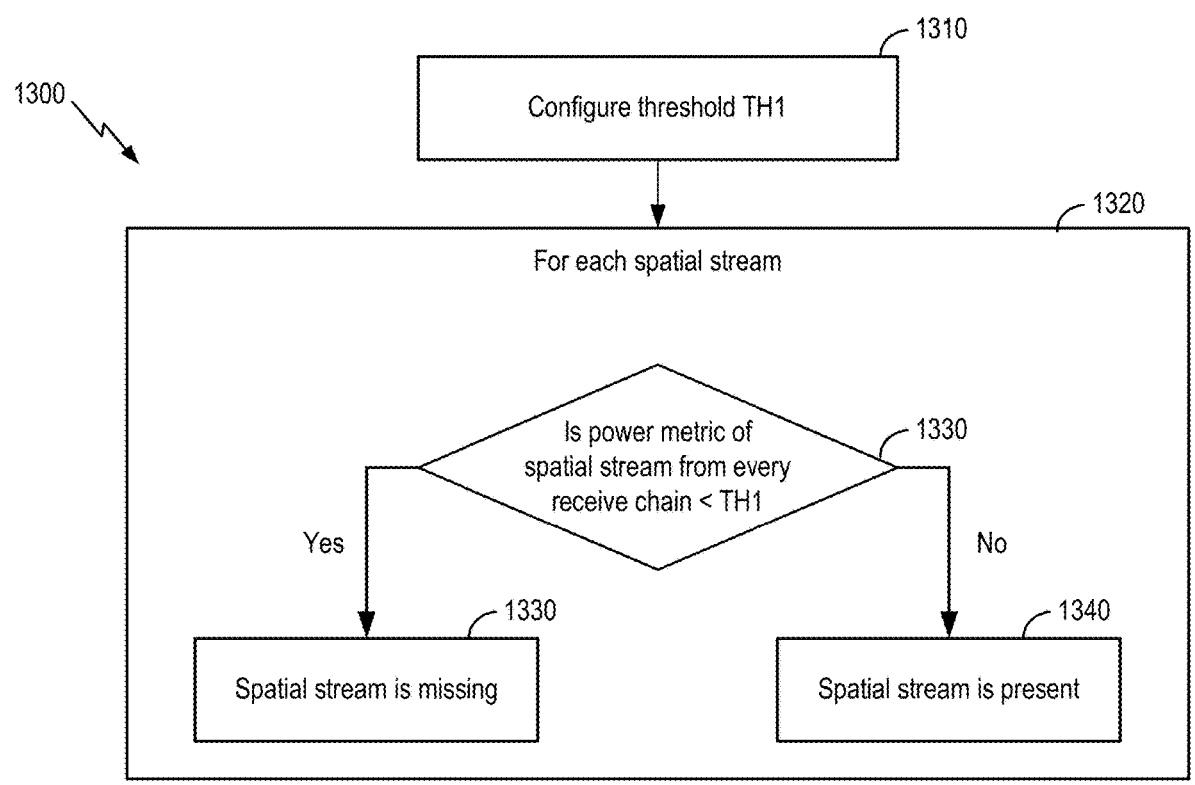
FIG. 13 shows a flowchart illustrating an example process, performed by an AP, for identifying one or more spatial streams that are unavailable to the AP for an UL MU-MIMO PPDU based on the one or more spatial streams not being transmitted by a STA in accordance with some examples.

FIG. 13 shows a flowchart illustrating an example process, performed by an AP, for identifying one or more spatial streams that are unavailable to the AP for an UL MU-MIMO PPDU based on the one or more spatial streams not being transmitted by a STA in accordance with some examples. In some aspects, the example process 1300 can be performed by an AP. In some other aspects, the process 1200 can be implemented by different devices based on the configuration of the communication service and the devices. For example, a user device in a 5G NR could implement some of the described processes herein with respect to carrier aggregation for multiple gNBs.

In one aspect, the example process 1300 determines that a STA does not transmit a spatial stream based on a comparison of the computed power metrics with a fixed or dynamic threshold. When the spatial stream provided from every receive chain is less than the threshold, the AP infers the STA does not transmit the spatial stream because the STA did not receive the trigger frame.

The AP initially begins at block 1310 by configuring a threshold TH1. In some examples, the threshold TH1 is fixed and determines that the received power of the spatial stream corresponds to noise. In some other examples, the threshold TH1 is computed based on an average from the power metrics of each channel estimate. For example, the threshold TH1 may be fixed to be an interval above a noise floor that could identify potential interfering signals to ascertain that the spatial stream was not transmitted.

At block 1320, the AP iterates over each spatial stream and performs the functions further enclosed in block 1320 for the spatial stream as received by each receive chain. At block 1330 within the spatial stream iteration, the AP may determine if a power metric from every receive chain of the AP is less than the threshold TH1 at block 1330.

In some aspects, the AP may perform additional operations to determine if the spatial stream is present in block 1340. For example, the spatial stream may include a sequence of smaller code blocks with each block having error check data (for example, in an error check field). As the AP begins decoding the spatial stream and a block is finished decoding, the AP can ascertain if the data was successfully decoded based on the error check data. The AP can further use this information to determine that the spatial stream is unavailable.

If it is determined that if a power metric from every receive chain of the AP is less than the threshold TH1, the AP determines that the spatial stream is unavailable at block 1330. If it is determined that if a power metric from every receive chain of the AP is not less than the threshold TH1, the AP determines that the spatial stream is present.

The process 1300 determines if any signal corresponding to the spatial stream is received by comparing each spatial stream at each receive chain of the AP. When the spatial stream is unavailable in the process 1300, the AP ascertains that the assigned STA does not transmit the spatial stream because the STA did not receive or decode the trigger frame.

Figure 14:
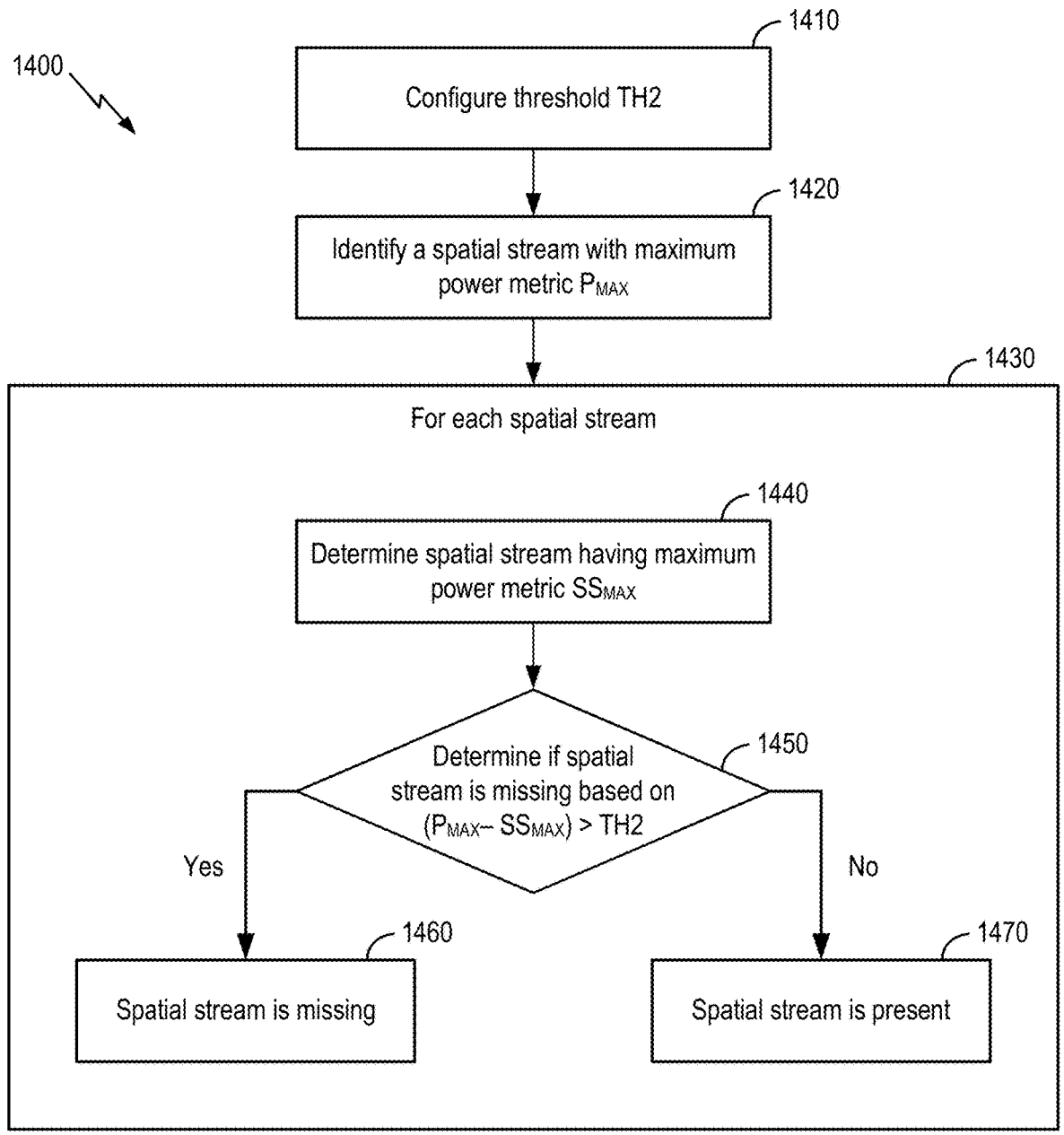
FIG. 14 shows a flowchart illustrating another example process, performed by an AP, for identifying one or more spatial streams that are unavailable to the AP for an UL MU-MIMO PPDU based on an insufficient received power of the one or more unavailable spatial streams in accordance with some examples.

FIG. 14 shows a flowchart illustrating another example process 1400, performed by an AP, for identifying one or more spatial streams that are unavailable to the AP for an UL MU-MIMO PPDU based on an insufficient received power of the one or more unavailable spatial streams in accordance with some embodiments. In some aspects, the process 1300 can be performed by an AP. In some other aspects, the process 1200 can be implemented by different devices based on the configuration of the communication service and the devices. For example, a user device in a 5G NR could implement some of the described processes herein with respect to carrier aggregation for multiple gNBs.

The AP initially begins at block 1410 by configuring a threshold TH2. In some aspects, the threshold TH2 is a fixed number and determines that the received power of the spatial stream cannot be used in the UL MU-MIMO PPDU based on the power metric. In the event the AP receives a spatial stream having a power level that is outside a suitable range (e.g., a tolerance window), the decoding process of the spatial stream may introduce errors into the decoding process of all spatial streams. This can occur when the STA is unable to transmit at a suitable power level (e.g., the STA does not have any power headroom).

At block 1420, the AP identifies a spatial stream from all of the spatial streams having a maximum power metric $P_{MAX}$. At block 1430, the AP iterates over each spatial stream and performs the functions further enclosed in block 1430 for the spatial stream as received by each receive chain.

At block 1440, the AP may determine the spatial stream as received by each receive chain having a maximum power metric $SS_{MAX}$. The spatial stream having the maximum power metric $SS_{MAX}$ is a candidate spatial stream that will be used for decoding the UL MU-MIMO PPDU.

At block 1450, the AP may determine if the current spatial stream is unavailable based on the maximum power metric $P_{MAX}$, the candidate spatial stream $SS_{MAX}$, and the threshold TH2. In some aspects, the AP may determine if a difference between the maximum power metric of the candidate spatial stream $SS_{MAX}$ and the maximum power metric $SS_{MAX}$ is the spatial stream is greater than the threshold TH2.

In some aspects, the AP may perform additional operations to determine if the spatial stream is present in block 1450. For example, the spatial stream may include a sequence of smaller code blocks with each block having an error check data. As the AP begins decoding the spatial stream and a block is finished decoding, the AP can ascertain if the data was successfully decoded based on the error check data. The AP can further use this information to deem that the spatial stream is unavailable.

In the event the difference between the maximum power metric $P_{MAX}$ and the maximum power metric $SS_{MAX}$ of the spatial stream is greater than the threshold TH2 at block 1450, the AP determines that the spatial stream is unavailable at block 1460 because the power difference between the spatial stream having the largest power metric and candidate spatial stream $SS_{MAX}$ is outside of a tolerable power range. In some aspects, including the candidate spatial stream $SS_{MAX}$ outside of the tolerable power range may introduce errors in the receiving of the UL MU-MIMO PPDU.

In the event the difference between the maximum power metric $P_{MAX}$ and the maximum power metric $SS_{MAX}$ of the spatial stream is less than the threshold TH2 at block 1450, the AP determines that the spatial stream is present at block 1470.

The process 1400 determines if a spatial stream transmitted by a STA is received by the AP outside a tolerance range that may introduce errors if used in the decoding process, then the AP may exclude the spatial streams of the STA outside of the tolerance range to improve receiver performance.

Figure 15:
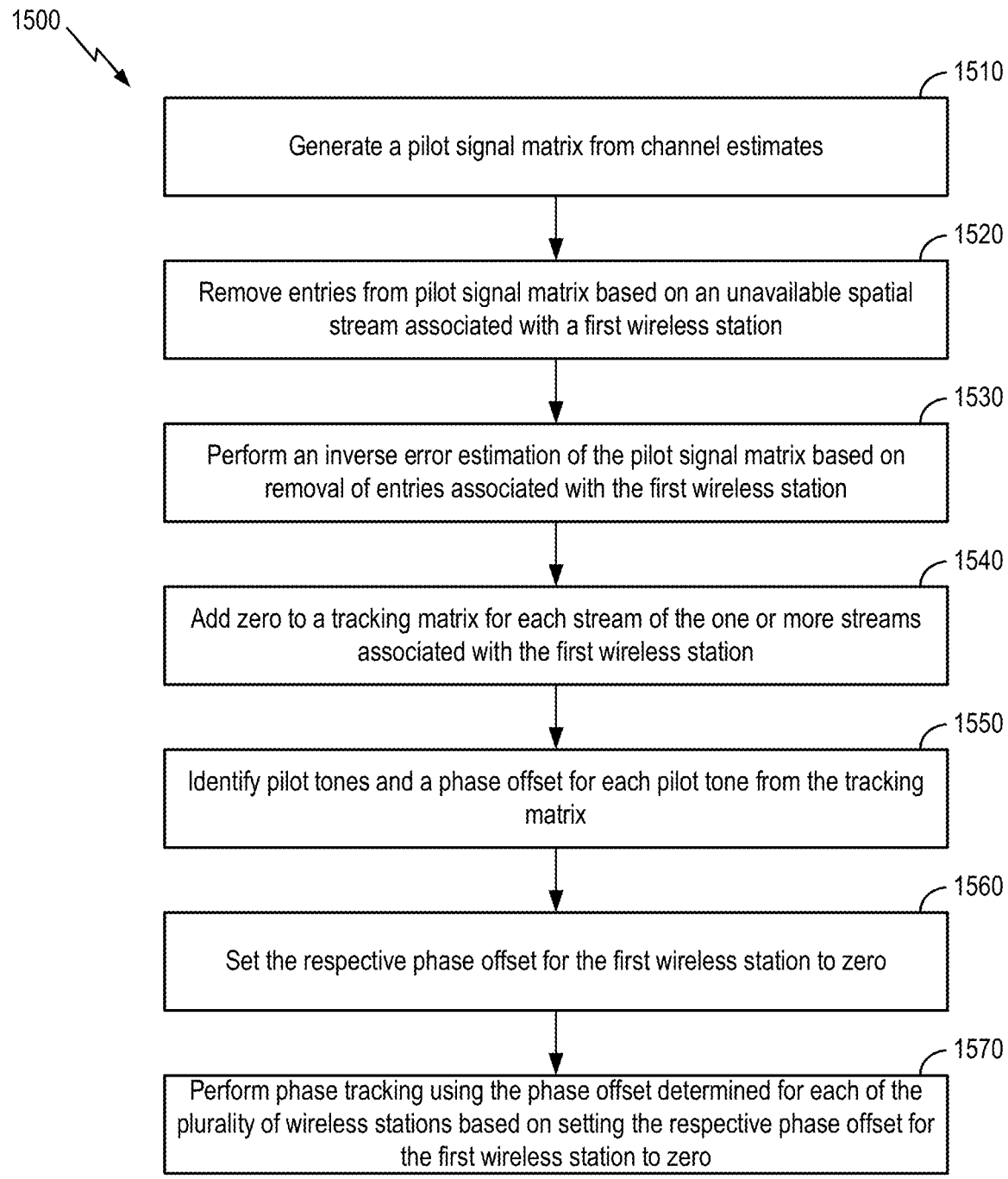
FIG. 15 shows a flowchart illustrating an example process, performed by an AP, for improving phase tracking when one or more spatial streams from an STA are unavailable in accordance with some examples.

FIG. 15 shows a flowchart illustrating an example process 1500, performed by an AP, for improving phase tracking when one or more spatial streams from a STA are unavailable in accordance with some examples. In some aspects, phase tracking is performed to correct phase differences in each spatial stream due to clock drift, oscillator differences, for example.

At block 1510, the AP generates a pilot signal matrix from the spatial streams. In some aspects, the AP may filter the pilot tones from the frequency samples from the fast Fourier transform (FFT). At block 1520, the AP may remove entries from the pilot signal matrix based on unavailable spatial streams associated with a STA. In some aspects, the AP may reduce the dimensions of the pilot signal matrix to remove entries associated with a spatial stream (e.g., from a 4×4 matrix to a 4×3 matrix).

At block 1530, the AP may perform a minimum mean square error (MMSE) inverse error estimation of the pilot signal matrix based on removal of entries associated with the first wireless station. In some aspects, the matrix may be referred to as a tracking matrix after the MMSE inverse error estimation. After performing the MMSE inverse error estimation, the AP may add a zero to the tracking matrix for each spatial stream of the one or more streams associated with the first wireless station at block 1540. At block 1550, the AP may identify pilot tones and a phase offset for each pilot tone from the tracking matrix. After identification of the pilot tones, the AP may set the respective phase offset for the first wireless station to zero at block 1560. At block 1570, the AP may then perform phase tracking using the phase offset determined for each of the plurality of wireless stations based on setting the respective phase offset for the first wireless station to zero.

In some aspects, after computing the pilot channel inverse, the AP may repopulate the entries corresponding to the removed unavailable streams with zeros, which cancels any phase contribution from the unavailable spatial streams during the pilot phase tracking in the data portion of the packet. Canceling any phase contribution from the unavailable spatial streams minimizes magnitude correction contribution from the unavailable spatial stream during the payload and magnitude correction factor for all the unavailable spatial stream streams is set to 1 during the entire UL MU-MIMO PPDU. In addition, no further changes may be needed for the phase tracking during HE/EHT-LTFs for 2×LTF and 4×LTF modes and there are no updates to the M matrix or the correction matrix calculations.

Figure 16:
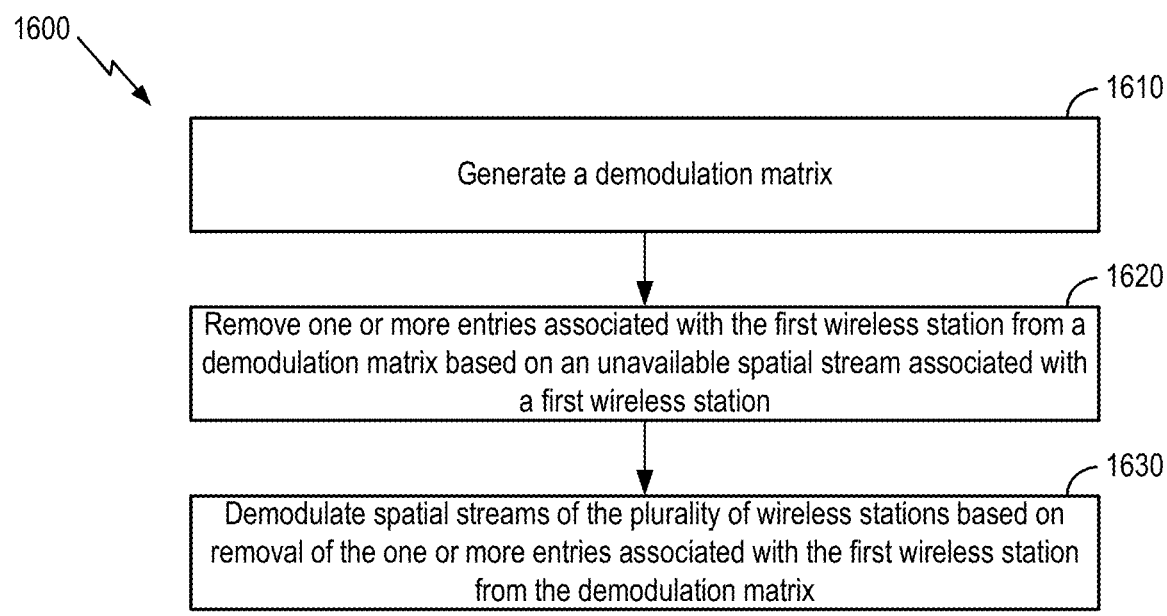
FIG. 16 shows a flowchart illustrating an example process, performed by an AP, for demodulating symbols of a received UL MU-MIMO PPDU when one or more spatial streams from an STA are unavailable in accordance with some examples.

FIG. 16 shows a flowchart illustrating an example process 1600, performed by an AP, for demodulating symbols of an UL MU-MIMO PPDU when one or more spatial streams from a STA are unavailable in accordance with some examples.

At block 1610, the AP may generate a demodulation matrix from the spatial streams. In some aspects, the demodulation matrix is processed to identify the symbol and its corresponding raw data value based on the matrix. In the event of unavailable spatial streams, the values in the demodulation matrix may affect the calculations and subsequent demodulation processes.

At block 1620, the AP may remove one or more entries associated with the first wireless station from a demodulation matrix based on an unavailable spatial stream associated with a first wireless station. Equation 3 below illustrates removing two spatial streams that are unavailable.

$$\begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \xrightarrow{\text{yields}} \begin{bmatrix} h_{11} & X & X & h_{14} \\ h_{21} & X & X & h_{24} \\ h_{31} & X & X & h_{34} \\ h_{41} & X & X & h_{44} \end{bmatrix} = \begin{bmatrix} h_{11} & h_{14} \\ h_{21} & h_{24} \\ h_{31} & h_{34} \\ h_{41} & h_{44} \end{bmatrix} \quad \text{(Equation 3)}$$

At block 1630, the AP may demodulate spatial streams of the plurality of wireless stations based on removal of the one or more entries associated with the first wireless station from the demodulation matrix. In some aspects, by simplifying the demodulation matrix, the QR decomposition of the decoding matrix can be simplified to improve the performance of the demodulation. Equation 3 illustrates the QR decomposition on reduced dimensions and the LLR result when the unavailable spatial streams are removed from the demodulation matrix.

$$\begin{bmatrix} h_{11} & h_{14} \\ h_{21} & h_{24} \\ h_{31} & h_{34} \\ h_{41} & h_{44} \end{bmatrix} = Q_1 \begin{bmatrix} r_{11}^2 & r_{12}^2 \\ & r_{22}^2 \end{bmatrix} \begin{bmatrix} y_1'^1 \\ 0 \\ 0 \\ y_2'^1 \end{bmatrix} \Rightarrow \begin{bmatrix} r_{11}^2 & 0 & 0 & r_{12}^2 \\ & 0 & 0 & 0 \\ & & 0 & 0 \\ & & & r_{22}^2 \end{bmatrix} \quad \text{(Equation 4)}$$

In some aspects, the above calculations are just one stage of the demodulation process. Additional stages such as rotation and post-processing may be performed on reduced dimension matrixes to simplify calculations and prevent introduction of errors.

In some aspects, a joint spatial-time/frequency domain metric computed for each link of the MIMO communication channel can provide benefits in optimizing and simplifying the smoothing filter selection criteria to enhance the channel estimate quality under multiple receive scenarios. For a SU, smoothing filter selection may rely on AGC power measurements or equivalent RSSI comparisons to decide between a low SNR smoothing filter or a high SNR smoothing filter. While this is appropriate for a SU with co-located transmit antennas, AGC power measurements or equivalent RSSI comparisons are not suitable for MU reception where different user channels may vary significantly in terms of their path loss with respect to the receiver. This variability may not be captured using AGC overall measurements and hence this criterion may not be extended for multi-user receive operations In some aspects, the time domain AGC power metrics can be used to determine a filter that is applied to the channel to smooth noise and improve receiver performance. For example, the receiver can provide an RSSI value that provides information related to the noise in the channel. In the case of a low RSSI, the receiver may smooth more aggressively to remove noise in the channel. In the case of a high RSSI, the channel will not contribute much noise and the channel can be filtered less aggressively to attempt to capture the channel delay profile due to multipath fading. The AGC can provide a power measurement in the time domain and can improve performance if all transmitters are collocated such as a SU transmission. In a MU transmission, the transmitters are not co-located and different user channels may vary significantly in terms of their path loss with respect to the receiver. This variability cannot be captured using AGC time-domain measurements because the measurement is a superposition of the different channels.

In some aspects, the receiver can use the channel per-chain per-stream joint spatial-time/frequency domain metric to generate a metric to identify differences in the spatial streams at the receiver. In some cases, the joint spatial-time/frequency domain metrics can be used to identify changes in the stream as a result of the channel conditions. In some cases, one channel may be flat and another channel may not be flat and the receiver may need to capture more from the non-flat channel to obtain more information related to multipath to appropriately smooth the channel. In some cases, the joint spatial-time/frequency domain metrics can be used to determine filter parameters such as aggressive smoothing or less aggressive smoothing, a wider filter or a narrower filter, and so forth. In some aspects, the self-correlation matrix can identify whether each stream is independent or not independent and can be used to determine channel independence to improve channel filtering. The joint spatial-time/frequency domain metric can be in the form of an equivalent frequency domain per stream per chain RSSI metric.

In some other aspects, the receiver can use a unique per chain per stream frequency-domain (FD) or time-domain (TD) metric to enable similar RSSI comparisons for both SU and MU reception while maintaining the same receiver configurations and settings during the channel estimation. The unique per-chain per-stream FD or TD metric also provides a reliable scheme to select the correct smoothing filter for all channel estimate elements independent of the individual link channel estimation results. For example, in a 4×4 configuration, a flat filter would be picked a channel estimates elements having a flat profile. In some cases, in the event of a cabled channel connection, the receiver can override the channel estimates as described herein with reference to FIG. 20. In some other aspects, in the event of a non-cabled channel connection, a FD per chain per stream RSSI metric can provide a reliable alternative and may yield a more aggressive filter that is narrower time domain bandwidth for irrelevant channel elements and may yield better performance in some cases.

For uplink MU reception, a smoothing filter selection process can utilize user MCS information to provide additional data to select the suitable filter. Using both FD per chain per stream RSSI information or MCS user information, the receiver logic can determine whether to use a low or a high SNR smoothing filter. The wireless communication device can determine the remaining smoothing filter parameters such as the bandwidth of the filter in the time-domain based on the channel estimation results and may utilize the same criterion for SU and MU.

Figure 17:
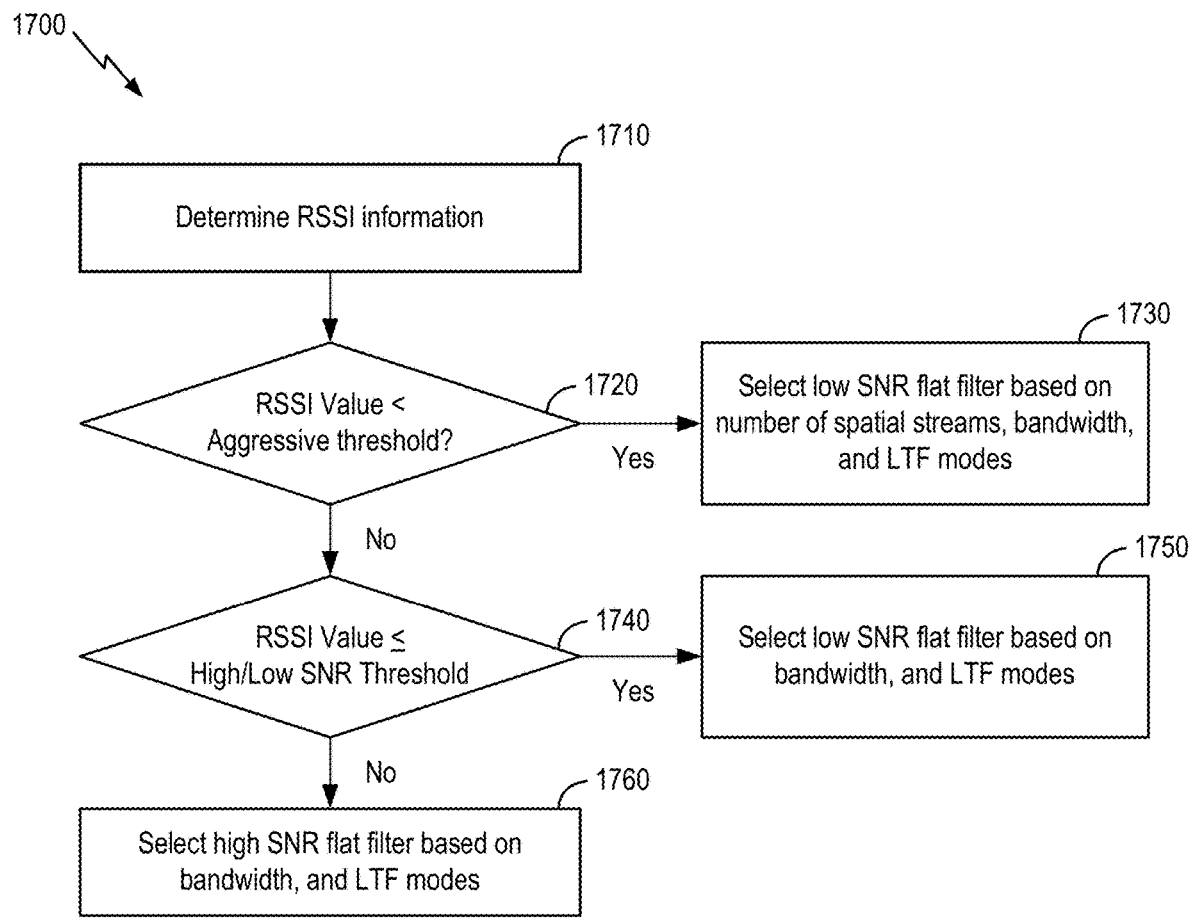
FIG. 17 illustrates an example process, performed by an AP, for selecting a smoothing filter for each spatial stream of multiple spatial streams from each receive chain of multiple receive chains that improves receiver performance in accordance with some examples.

FIG. 17 shows an example process 1700 for selecting a smoothing filter for each spatial stream of multiple spatial streams from each receive chain of multiple receive chains that improves receiver performance in accordance with some examples. In some aspects, the example process is performed by a wireless communication device, such as an AP or a STA.

In some aspects, SU smoothing filter selection may rely on AGC power measurements or equivalent RSSI comparisons to decide between a low/high SNR smoothing filter. While this is appropriate for a SU with co-located transmit antennas, it is not suitable for MU reception where different user channels may vary significantly in terms of their path loss with respect to the receiver. This variability may not be captured using AGC overall measurements and other MU receiver operations. Accordingly, selecting a suitable smoothing filter improves receiver performance. In some aspects, the equivalent unique per chain per stream frequency domain or time domain metric enables similar RSSI comparisons for both SU and MU reception while keeping the same receiver configurations and settings during the channel estimation phase.

At block 1710, the device may determine filter information of the spatial stream. In some aspects, an RSSI information is provided (e.g., from the AP or STA) or may be calculated from received stream (e.g., spatial streams normalized in the time domain or frequency domain).

At block 1720, the device may determine if an RSSI value of the RSSI information is less than an aggressive threshold. If the RSSI value is less than the aggressive threshold, the device may select low SNR flat filter as the smoothing filter based on a number of spatial streams, bandwidth, and LTF modes at block 1730. In some aspects, if the signal does not have enough signal strength, the channel smoothing should be conservative to preserve the signal for decoding. In some aspects, a SNR flat filter would be picked for only the flat channel estimate elements flagged above yielding up to 0.5 dB performance loss. In some other aspects, the receiver may rely on cable detection to override this filter.

If the RSSI value is greater than the aggressive threshold, the device may determine the RSSI value is less than or equal to a threshold for determining whether to apply a low SNR filter or a high SNR filter at block 1740. In some cases, the threshold may be based on frequency domain per chain per stream RSSI information and MCS information. If the RSSI value is less than or equal to the threshold, the device may select a low SNR flat filter based on bandwidth, and LTF modes at block 1750. Otherwise, the device selects a high SNR flat filter based on bandwidth and LTF modes at block 1760. In some cases, the remaining smoothing filter logic such as the degree of aggressiveness, the bandwidth of filter in the time domain may be decided based on the channel estimation results and may be applied to both for a SU and MU.

In some aspects, the receiver of the wireless communication device can use a joint spatial-frequency/time domain metric per link of the MIMO communication channel in physical layer integrity checks to identify interference, identify jammers, confirm channel classification, and detect attack potential attacks. To identify physical layer integrity, a dynamic range for each link can be evaluated to identify changes in the physical layer in the time domain that indicate the presence of other signals that are affecting the receiver performance. In some aspects, a PPDU may include multiple training fields and the physical layer integrity check can occur in a single packet. For a legacy PPDU, the physical layer integrity check can occur across subsequent PPDUs.

In some other aspects, if the receiver of the wireless communication device can estimate the channel more than once during the same packet reception, the wireless communication device may be able to identify attackers and intruders. For example, in 801.11az there are two LTF sequences and in 802.11ax/801.11be there is a preamble with an LTF sequence and a mid-amble with a different LTF sequence. In such aspects, a small dynamic range can indicate that the same channel is observed over the multiple channel estimations and ensures the same user is requesting the information about the location or any other service. When the dynamic range exceeds a threshold, the dynamic range measurement implies that an attacker at a different physical location is experiencing a different channel realization link and may be trying to intercept the service link to listen in or gain illegitimate access to information or location and compromise the user's security.

Figure 18:
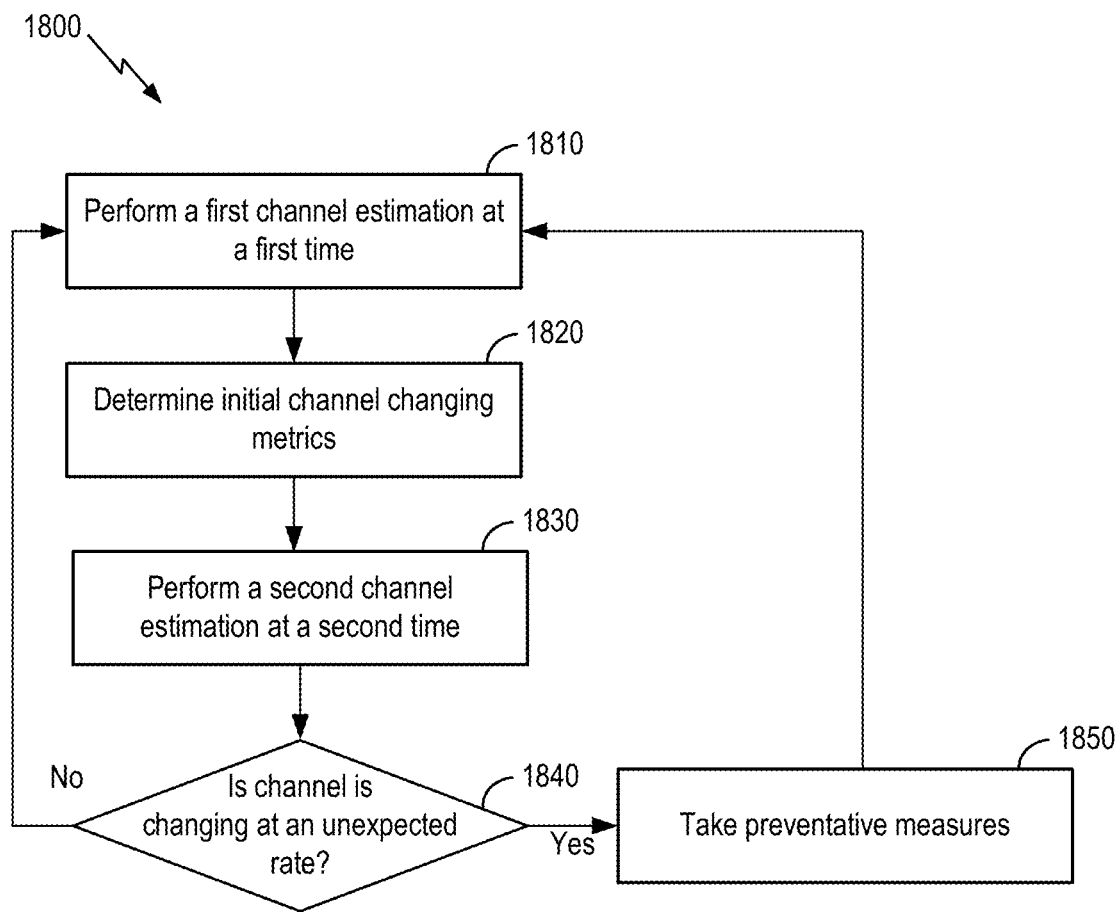
FIG. 18 shows a process, performed by an AP, for assessing a physical layer integrity check of a channel using joint spatial-time/frequency domain metrics of a channel at different times in accordance with some examples.

FIG. 18 shows a process for assessing a physical layer integrity check of a channel using joint spatial-time/frequency domain metrics of the channel at different times in accordance with some examples. In some aspects, the example process is performed by a wireless communication device, such as an AP or a STA.

At block 1810, the wireless communication device can perform a first channel estimation at a first time using the joint spatial-time/frequency domain metric. In some aspects, the wireless communication device can determine a dynamic range for each channel from the joint spatial-time/frequency domain metric and provide an expected channel performance. At block 1820, the wireless communication device determines an initial channel changing metric for each channel or stream based on the channel estimation. For example, in the event of a cabled connection, the channel is changing at a steady rate and any subsequent channel measurements should be within a predictable range.

At block 1830, the wireless communication device can perform a second channel estimation at a second time using the joint spatial-time/frequency domain metric. The second time may be during the reception of the same packet or a different packet. At block 1840, the wireless communication device determines whether the channel is changing at an unexpected rate. For example, in the event of a cabled connection and the channel changes at a rate that is outside of the predictable range, the changes to the channel can indicate the presence of an attacker, interferer, or other malicious actor.

In some aspects, during the channel estimation at block 1840, the wireless communication device can determine a dynamic threshold based on a number of parameters such as users, channel estimation, and so forth. For example, a cabled channel will be associated with a small threshold because the channel response is generally flat and a non-cabled connection will change faster and will have a larger threshold. In some aspects, the channel estimation can be based on metrics of a particular user and changes to channels of the user can indicate an interferer associated with only that user.

When the channel is changing at an unexpected rate, the wireless communication device can take preventative measures at block 1850. In some aspects, the wireless communication device can provide information to upper layers to characterize an interference source and advise a user to move away from an interfering device or provide a security notification. In some aspects, the physical layer classification may be used by the upper layers to reject such an attacker intervention and enhance the overall system security.

In some aspects, the wireless communication device can consider doppler-related measurements to confirm information about a stomper packet. For example, if a relatively large time interval has passed compared to the amount of doppler expected to be tolerated by the communication link of interest, the information may be discarded, and the wireless communication device can reset the baseline values.

In some other aspects, the wireless communication device may check each dynamic range check of each metric of the communication link per each associated STA. The wireless communication device can compute dynamic range check from channel estimate over subsequent packet reception from each associated station and saved in upper layers and to confirm or refine the channel classification identification that is done per each STA. The confirmations may also be subject to doppler intervals limits.

In some aspects, the wireless communication device can use ML or sphere decoding to demodulate and decode the signals for optimal receiver performance in a multipath environment. ML or sphere decoding is intensive and consumes significant power. In some aspects, lower power consumption is preferable due to physical size, heat generation, and other issues associated with higher power consumption. In some aspects, MMSE or a zero-forcing (ZF) receiver processing can consume significantly less power than ML. MMSE has optimal performance when the channels is orthogonal, and the orthogonal channels can usually be perceived when the packet is transmitted through a cable connection or when the packet is transmitted with beamforming.

In some aspects, the wireless communication device can use the joint spatial-time/frequency domain metrics to identify whether a channel is orthogonal. For example, a cable connection as described herein with reference to FIG. 7, indicates orthogonal channels and can determine the type of demodulation to reduce power consumption to demodulate the signal.

Figure 19:
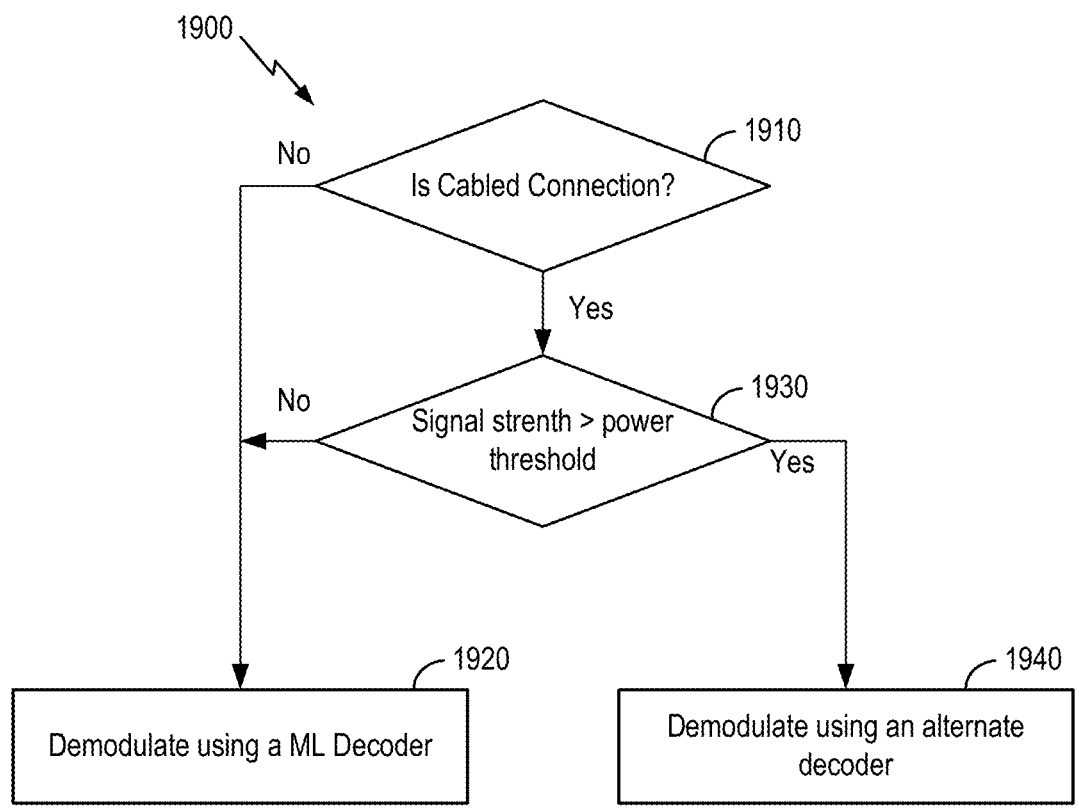
FIG. 19 shows a process, performed by an AP, for selecting a decoder type based on a channel classification in accordance with some examples.

FIG. 19 shows a process for selecting a decoder type based on a channel classification using joint spatial-time/frequency domain metrics of a channel in accordance with some examples. In some aspects, the example process is performed by a wireless communication device, such as an AP or a STA.

At block 1910, the wireless communication device can determine whether the channel corresponds to a cabled connection as described with reference to FIG. 7. If the channel does not correspond to a cabled connection, the channel is not orthogonal, and the receiver operations cannot be simplified and the channel can be demodulated using an ML decoder at block 1920.

When the channel does correspond to a cabled connection at block 1910, the wireless communication device can determine if the signal strength such as an RSSI value is greater than a power threshold. If the signal strength is not greater than a power threshold, the receiver operations cannot be simplified, and the wireless communication device can demodulate the signals on the channel using an ML decoder at block 1920. On the other hand, if the signal strength is greater than a power threshold at block 1930, the receiver operations can be simplified, and the wireless communication device can demodulate the signals on the channel using an alternative decoder process at block 1940. In some aspects, the alternative decoder process can be an MMSE decoder, a ZF decoder, or another suitable decoder that has less intensive computations and consumes less power than the ML decoder.

In some other aspects, the cable connection identifies the relevant channel elements in the communication link and can be used to improve receiver performance. Because the elements that are contributing to the spatial stream are identified in the self-correlation matrix, all other elements that do not contribute can be removed from the channel estimate matrix by nulling or deselecting values in the channel estimate. In some aspects, nulling or deselecting irrelevant channel elements in the communication link removes additional noise that does not serve in signal decoding, which improves the decoding performance of the receiver. Because a cabled channel is a frequency flat channel with a large coherence bandwidth and a small delay spread on all relevant channel elements, then a narrow smoothing filter in the time domain is appropriate in smoothing these channels. If a joint assessment is not performed, the wireless communication device would assess irrelevant channel elements as frequency selective and would require wider filters in the time domain, which may enhance the noise on these irrelevant channel elements and degrade decoding performance. Utilizing the cable detection flag for all elements of this channel would yield noise reduction to improve receive sensitivity, particularly in low SNR scenarios such as users located far from an AP.

Figure 20:
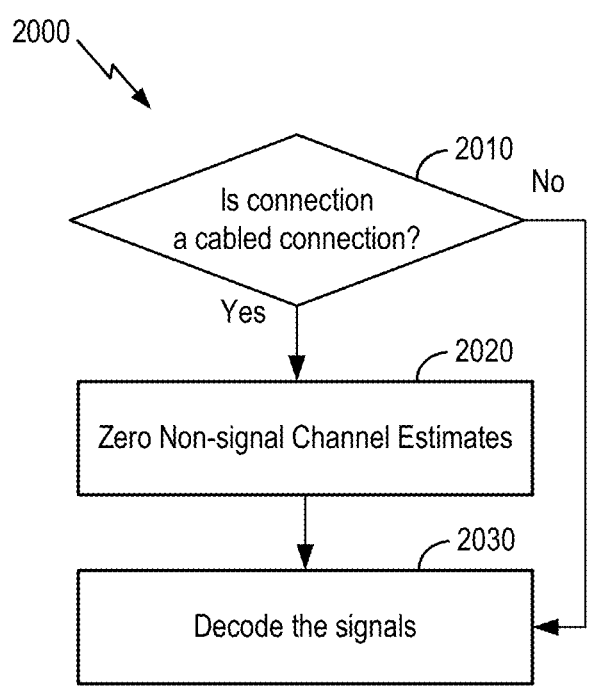
FIG. 20 shows a process, performed by an AP, for decoding an UL MU-MIMO PPDU based on a channel classification in accordance with some examples.

FIG. 20 shows a process for decoding an UL MU-MIMO PPDU based on a channel classification in accordance with some examples. In some aspects, the example process is performed by a wireless communication device, such as an AP or a STA.

At block 2010, the wireless communication device determines whether the channel corresponds to a cabled connection as described with reference to FIG. 7. If the channel does correspond to the cabled connection, the wireless communication device sets all non-signal channel elements to zero at block 2020. After zeroing the non-signal elements at block 2020 or after determining the channel does not correspond to the cabled connection, the wireless communication device decodes the signals using the channel estimates at block 2030.

FIG. 21 shows a block diagram of a receiver 2100 (e.g., an AP) that supports detecting and compensating for one or more unavailable spatial streams from a STA in an UL MU-MIMO PPDU in accordance with some examples. The receiver 2100 depicts relevant portions related to detecting an unavailable STA and omits nonessential details for understanding of this instant disclosure. The receiver 2100 also includes a plurality of receive chains to allow concurrent reception of spatial streams from at least one STA.

The receiver 2100 includes a FFT 2105 for receiving the spatial signals in the time domain and computing frequency domain samples with a discrete Fourier transform (DFT). In some examples, the receiver can receive a plurality of spatial streams from a plurality of receive chains and the FFT 2105 converts each spatial stream into a stream of frequency samples.

A channel estimator 2110 receives frequency samples of the spatial streams and generates channel estimates by attempting to measure a training field (e.g., an EHT-LTF, HE-LTF, etc.) that contains a known sequence of tones (e.g., tones associated with an OFDMA system). In some cases, the channel estimation can be in the frequency domain (e.g., on a tone-by-tone basis), such as a frequency response estimation. In some cases, the channel estimation can be in the time domain, such as based on a channel impulse response estimation. When a receive chain attempts to measure a training field that has not been transmitted on the spatial stream, the resulting channel estimate will be based on measuring noise and interfering signals.

The channel estimator 2110 receives AGC information and at least one threshold value for identifying information. In some aspects, the AGC information is used to determine a connection type in connection with a filter selection (e.g., for selection of a smoothing filter), as described in more detail below. In some cases, a first threshold is used to determine a first type of unavailable STA, and a second threshold is used to determine a second type of unavailable STA. In some aspects, the channel estimator 2110 may be configured to remove information from the channel estimate matrix based on an unavailable STA.

The channel estimator 2110 provides a channel estimate matrix and any other relevant information to a tracker engine 2130 that tracks a magnitude of signals and a phase of signals for each user (e.g., per user tracking), such as each STA associated with an UL MU-MIMO transmission. In some aspects, the tracker engine 2130 may track a phase variation of the spatial streams from different STAs and compensate for any phase variations. The tracker engine 2130 may also compensate for phase variation in pilot tones and magnitude variations. In some aspects, by removing values associated with an unavailable STA, the tracker engine 2130 can improve tracking of each STA.

In some aspects, the channel estimator 2110 also provides the channel estimate matrix and any other relevant information to a controller 2120 that combines the frequency samples of the spatial streams. The controller 2120 and tracker engine 2130 may provide an output to the demodulator 2140. The demodulator 2140 may demodulate the streams based on per-user tracking information (from the tracker engine 2130) and unavailable STA information (from the channel estimator 2110, tracker engine 2130, or the controller 2120). In some cases, the demodulator 2140 or other component may generate a demodulation matrix that is converted into raw data. The demodulator 2140 may remove rows or columns (e.g., entries) in the demodulation matrix to improve receiver performance.

FIG. 22 shows a block diagram of a channel estimator 2110 that supports detecting and compensating for one or more unavailable spatial streams from a STA in an UL MU-MIMO PPDU in accordance with some examples. The channel estimator 2110 receives a plurality of spatial streams, AGC information, and at least one threshold as described with reference to FIG. 10. A signal detector 2210 receives the frequency samples from the FFT 2105 and filters unnecessary information and content from the frequency samples. The signal detector 2210 can also measure the training field associated with the spatial stream. In some cases, the signal detector 2210 can remove the training fields from the frequency samples.

The signal detector 2210 provides channel estimate matrices to the spatial stream detector 2220. The spatial stream detector 2220 evaluates the spatial streams (based on the channel estimate matrices) and determines whether any spatial streams are unavailable from a given STA (or user), referred to as unavailable spatial streams or unavailable STAs. In some aspects, the at least one threshold is used to identify different types of unavailable STAs. For instance, one type of unavailable STA is an STA that does not transmit the spatial stream. Another type of unavailable STA is an STA that transmits a spatial stream at a lower power level (e.g., a power level below an RSSI value requested by the AP for an UL MU-MIMO transmission, such as the receiver 2100). In some cases, spatial stream detector 2220 can receive a power headroom that identifies a range between a transmission power of the STA and a maximum transmission power. In the event the power headroom is 0 dB, the STA is transmitting at a maximum transmission power. The spatial stream detector 2220 may output information to other components in the receiver 2100 to identify spatial streams that may degrade performance of the receiver 2100.

The signal detector 2210 may also output the frequency samples to a smoothing filter selector 2230, which selects a suitable smoothing filter. The signal detector 2210 may also output the channel estimates to a cabled channel detector 2240 which detects the existence of a cabled channel. In some aspects, a cabled channel is an orthogonal channel with dominant eigen modes that are equal to both the number of active transmit chains and receive chains and correspond to the active connections between the transmit and the receive chains. These active connections have a wide coherence bandwidth compared to the transmitted signal while any other links on this channel will carry no signal contributions but rather uncorrelated additive white gaussian noise (AWGN) and serve no useful contribution in decoding the underlying data transmission in this link.

A filter 2250 receives the frequency samples, the selected smoothing filter, and an indication of a cabled channel from the cabled channel detector 2240. The filter selects the suitable filter and then filters the frequency samples based on the selected filter and other parameters. In some aspects, if the cabled channel detector 2240 does not indicate a cabled channel, the filter 2250 uses the selected filter from the smoothing filter selector 2230. In some other aspects, if the cabled channel detector 2240 indicates a cabled channel, the filter 2250 applies a narrow smoothing filter in the time domain because a cabled channel is a frequency flat channel with a large coherence bandwidth and a small delay spread on all relevant channel elements.

FIG. 23 shows a flowchart illustrating an example process 2300 that supports wireless communication by a wireless communication device. The process 2300 may be performed by a wireless communication device such as an AP, such as one of the APs 102 and 502 described above with reference to FIGS. 1 and 5A, respectively. In some implementations, the process 2300 may be performed by a wireless communication device operating as or within a STA, such as one of the STAs 104 and 504 described above with reference to FIGS. 1 and 5B, respectively.

In some implementations, in block 2302, the wireless communication device transmits a trigger frame to a plurality of wireless stations including a first wireless station. As described herein, the trigger frame is configured to elicit a joint transmission (to the wireless access point) of a multiuser (MU) packet over a plurality of spatial streams respectively associated with the plurality of wireless stations.

In some implementations, in block 2304, the wireless communication device receives the MU packet over the plurality of spatial streams. Each spatial stream of the plurality of spatial streams is received by a plurality of receive chains of the wireless access point. In one example, as illustrated in FIGS. 8A-8E, a first spatial stream is received by a first receive chain, a second receive chain, a third receive chain, and a fourth receive chain. Similarly, the second, third, and fourth spatial streams are each received by the first receive chain, the second receive chain, the third receive chain, and the fourth receive chain.

In some implementations, in block 2306, the wireless communication device performs a channel estimation associated with each spatial stream of the plurality of spatial streams using each receive chain of the plurality of receive chains. In some aspects, the wireless communication device is configured to determine, for each spatial stream of the plurality of spatial streams for each receive chain of the plurality of receive chains, a respective power metric based on a respective channel estimate associated with each spatial stream of the plurality of spatial streams and each receive chain of the plurality of receive chains. Referring to FIG. 8A as an illustrative example, the wireless communication device can analyze each link element 801, 805, 809, and 813 from each of the first, second, third, and fourth receive chain for the first spatial stream. For example, the wireless communication device can measure element 801 from the first receive chain and produce a power metric associated with the first spatial stream. The wireless communication device can further produce power metrics associated with elements 805, 809, and 813, as well as for the other spatial stream-receive chain combination elements.

In some implementations, in block 2308, the wireless communication device determines that at least one spatial stream associated with the first wireless station is unavailable based on the channel estimation. In some aspects, to determine that the at least one spatial stream associated with the first wireless station is unavailable, the wireless communication device is configured to determine that the at least one spatial stream associated with the first wireless station was not transmitted by the first wireless station based on the respective power metric. In some aspects, to determine that the at least one spatial stream associated with the first wireless station was not transmitted by the first wireless station, the wireless communication device is configured to determine that the respective power metric for the at least one spatial stream associated with the first wireless station is less than a threshold (e.g., a noise floor threshold). In one example, the wireless communication device may determine that a spatial stream associated with a STA was not transmitted by the STA based on determining that a respective power metric for the spatial stream is less than the threshold (e.g., the noise floor threshold). The threshold may include the threshold TH1 described above, which may be fixed to be an interval above a noise floor that could identify potential interfering signals to ascertain that the spatial stream is not transmitted. In some examples, the wireless communication device is configured to determine the threshold based on a requested receive signal strength at the wireless access point. In such examples, the trigger frame may indicate the requested receive signal strength.

In some aspects, the wireless communication device is configured to determine that the at least one spatial stream associated with the first wireless station cannot be decoded based on an error check field (for example, including error check data) in the MU packet. In such aspects, the wireless communication device may determine that the at least one spatial stream of the first wireless station is not available (e.g., not transmitted by the first wireless station) based on determining that at least one spatial stream associated with the first wireless station cannot be decoded based on the error check field. In some cases, the wireless communication device may determine that the at least one spatial stream of the first wireless station is not transmitted by the first wireless station based on the respective power metric associated with the first wireless station being less than the threshold (e.g., threshold TH1) and based on determining that at least one spatial stream associated with the first wireless station cannot be decoded.

In some aspects, to determine the respective power metric based on the respective channel estimate, the wireless communication device is configured to determine a first receive chain of the plurality of receive chains having a maximum received power for each spatial stream in the plurality of spatial streams and determine a second receive chain of the plurality of receive chains having a minimum received power for each spatial stream in the plurality of spatial streams. In some examples, the respective power metric corresponds to (e.g., can be used to identify) a correlation associated with a spatial stream and a receive chain.

In some implementations, to determine that the at least one spatial stream associated with the first wireless station is unavailable, the wireless communication device is configured to determine that the at least one spatial stream associated with the first wireless station cannot be received by the wireless communication device at a suitable power level for the MU packet based on a maximum power (e.g., a maximum received power) for the plurality of spatial streams and based on a difference between the respective power metric of the at least one spatial stream and the maximum power being greater than a threshold. For example, if the wireless communication device determines that the difference between the maximum power metric $P_{MAX}$ and the maximum power metric $SS_{MAX}$ of a particular spatial stream is greater than a threshold TH2, the wireless communication device may determine that the spatial stream is unavailable because the power difference between the spatial stream having the largest power metric and candidate spatial stream $SS_{MAX}$ is outside of a tolerable power range. In another example, if the wireless communication device determines that the difference between the maximum power metric $P_{MAX}$ and the maximum power metric $SS_{MAX}$ of the spatial stream is less than the threshold TH2, the wireless communication device may determine that the spatial stream is available or present.

In some aspects, the wireless communication device is configured to determine a type of smoothing filter to apply to a respective spatial stream of the plurality of spatial streams based on at least one of received signal strength information and modulation and coding scheme (MCS) information. The wireless communication device is further configured to filter the respective spatial stream based on the determined type of smoothing filter. In some examples, the wireless communication device is configured to determine parameters of the smoothing filter based on a number of spatial streams of the plurality of spatial streams, a bandwidth associated with the plurality of spatial streams, a resource unit (RU) assignment associated with the plurality of spatial streams, a long training field (LTF) mode associated with the plurality of spatial streams, or any combination thereof.

In some implementations, in block 2310, the wireless communication device processes the MU packet from the plurality of spatial streams without the at least one spatial stream. In some aspects, to process the MU packet from the plurality of spatial streams without the at least one spatial stream associated with the first wireless station, the wireless communication device is configured to remove the at least one spatial stream associated with the first wireless station from a tracking matrix associated with a pilot sequence. The wireless communication device can perform an inverse error estimation of the tracking matrix based on removal of the at least one spatial stream and can generate a phase offset for the plurality of wireless stations based on the inverse error estimation. In some cases, the wireless communication device is configured to add a zero to the tracking matrix for the at least one spatial stream to generate the phase offset for the plurality of wireless stations. In some aspects, to process the MU packet from the plurality of spatial streams without the at least one spatial stream associated with the first wireless station, the wireless communication device is configured to identify a plurality of pilot tones transmitted by the plurality of wireless stations and determine, from the plurality of pilot tones, a respective phase offset associated with each of the plurality of wireless stations. The wireless communication device is further configured to set a phase offset for the first wireless station to zero. The wireless communication device can perform phase tracking using the respective phase offsets determined for the plurality of wireless stations based on setting the phase offset for the first wireless station to zero.

In some implementations, to process the MU packet from the plurality of spatial streams without the at least one spatial stream associated with the first wireless station, the wireless communication device is configured to remove one or more entries associated with the first wireless station from a demodulation matrix. The wireless communication device is further configured to demodulate one or more spatial streams of the plurality of spatial streams based on removal of the one or more entries associated with the first wireless station from the demodulation matrix.

Figure 24:
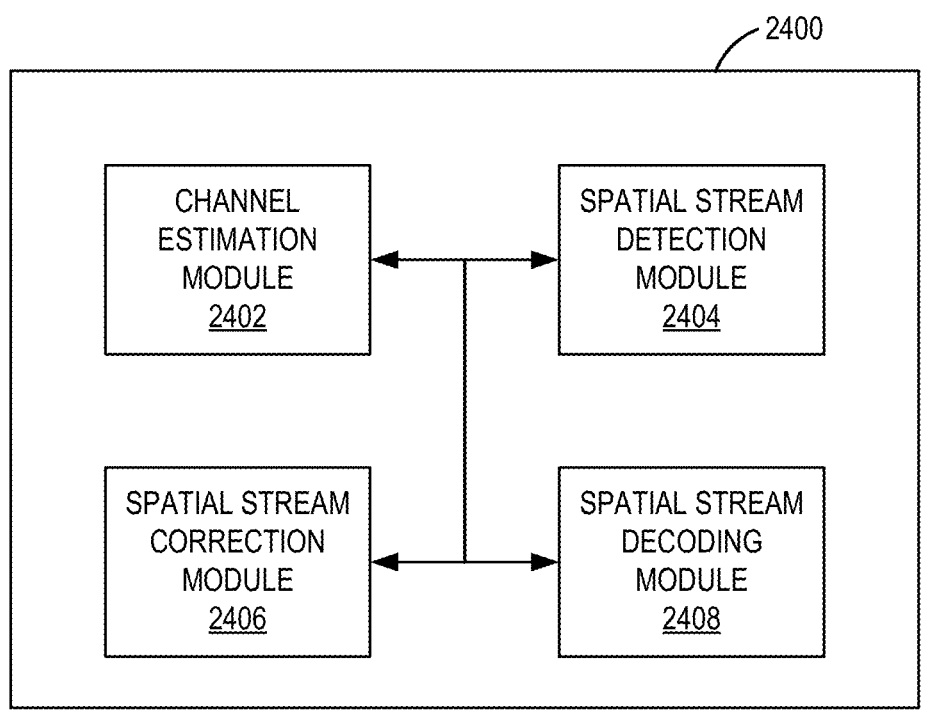
FIG. 24 shows a block diagram of an example wireless communication device configured to receive and demodulate an UL MU-MIMO PPDU according to some examples.

FIG. 24 shows a block diagram of an example wireless communication device 2400 configured to receive and demodulate an UL MU-MIMO PPDU according to some aspects. While operations of the wireless communication device 2400 are described with respect to an UL MU-MIMO PPDU, the techniques described can be applied to other techniques and communication systems. In some aspects, the wireless communication device 2400 is configured to perform one or more of the processes described above. The processes can include the process 700 of FIG. 7, process 1200 of FIG. 12, process 1300 of FIG. 13, process 1400 of FIG. 14, process 1500 of FIG. 15, process 1600 of FIG. 16, process 1700 of FIG. 17, process 1800 of FIG. 18, process 1900 of FIG. 19, process 2000 of FIG. 20, process 2300 of FIG. 23, as well as any other process described herein. The wireless communication device 2400 may be an example aspect of the wireless communication device 400 described above with reference to FIG. 4. For example, the wireless communication device 2400 can be a chip, SoC, chipset, package or device that includes at least one modem (for example, a Wi-Fi (IEEE 802.11) modem or a cellular modem such as the modem 402), at least one processor (such as the processor 404), at least one radio (such as the radio 406) and at least one memory (such as the memory 408). In some aspects, the wireless communication device 2400 can be a device for use in an AP, such as one of the APs 102 and 502 described above with reference to FIGS. 1 and 5A, respectively. In some other aspects, the wireless communication device 2400 can be a AP that includes such a chip, SoC, chipset, package or device as well as at least one antenna (such as the antennas 520). In some aspects, the wireless communication device 2400 can be a device for use in a STA, such as one of the STAs 104 and 504 described above with reference to FIGS. 1 and 5B, respectively. In some other aspects, the wireless communication device 2400 can be a STA that includes such a chip, SoC, chipset, package or device as well as at least one antenna (such as the antennas 525).

The wireless communication device 2400 may include a channel estimation module 2402, a spatial stream detection module 2404, a spatial stream correction module 2406, and a spatial stream decoding module 2408. Portions of one or more of the modules 2402, 2404, 2406, and 2408 may be implemented at least in part in hardware or firmware. For example, each of the channel estimation module 2402, the spatial stream detection module 2404, the spatial stream correction module 2406, and the spatial stream filtering module 2406 may be implemented at least in part by one or more modems (for example, a Wi-Fi (IEEE 802.11) modem). In some aspects, at least some of the modules 2402, 2404, 2406, and 2408 are implemented at least in part as software stored in a memory. For example, portions of one or more of the modules 2402, 2404, 2406, and 2408 can be implemented as non-transitory instructions (or "code") executable by at least one processor to perform the functions or operations of the respective module.

In some aspects, the channel estimation module 2402 may be configured to perform channel estimation procedures for various spatial streams using each receive chain of the wireless communication device 2400. The spatial stream detection module 2404 may be configured to detect the existence or the non-existence of spatial stream using each receive chain of the wireless communication device 2400 and thereby determine if a STA is unavailable or unable to contribute to an UL MU-MIMO PPDU. The spatial stream correction module 2406 may be configured to correct the streams based on an unavailable stream and perform operations to improve receiver performance by operations associated with phase tracking. The spatial stream decoding module 2408 may be additionally configured to decode the spatial streams based on identification of unavailable spatial streams as described herein.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations and algorithm processes described in connection with the aspects disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the aspects described in this disclosure may be readily apparent to persons having ordinary skill in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Various features that are described in this specification in the context of separate aspects also can be implemented in combination in a single aspect. Conversely, various features that are described in the context of a single aspect also can be implemented in multiple aspects separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

Illustrative aspects of the present disclosure include:

Aspect 1: A method for wireless communication by a wireless access point, comprising: transmitting, to a plurality of wireless stations including a first wireless station, a trigger frame configured to elicit a joint transmission, to the wireless access point, of a multiuser (MU) packet over a plurality of spatial streams respectively associated with the plurality of wireless stations; receiving the MU packet over the plurality of spatial streams, each spatial stream of the plurality of spatial streams being received by a plurality of receive chains of the wireless access point; performing a channel estimation associated with each spatial stream of the plurality of spatial streams using each receive chain of the plurality of receive chains; determining that at least one spatial stream associated with the first wireless station is unavailable based on the channel estimation; and processing the MU packet from the plurality of spatial streams without the at least one spatial stream.

Aspect 2: The method of Aspect 1, further comprising: determining, for each spatial stream of the plurality of spatial streams for each receive chain of the plurality of receive chains, a respective power metric based on a respective channel estimate associated with each spatial stream of the plurality of spatial streams and each receive chain of the plurality of receive chains.

Aspect 3: The method of Aspect 2, wherein determining that the at least one spatial stream associated with the first wireless station is unavailable comprises: determining that the at least one spatial stream associated with the first wireless station was not transmitted by the first wireless station based on the respective power metric.

Aspect 4: The method of Aspect 2, wherein determining that the at least one spatial stream associated with the first wireless station is unavailable comprises: determining that the respective power metric for the at least one spatial stream associated with the first wireless station is less than a threshold; and determining that the at least one spatial stream associated with the first wireless station was not transmitted by the first wireless station based on the respective power metric being less than the threshold.

Aspect 5: The method of Aspect 4, further comprising: determining the threshold based on a requested receive signal strength at the wireless access point, wherein the trigger frame indicates the requested receive signal strength.

Aspect 6: The method of any of Aspects 1 to 5, further comprising: determining that the at least one spatial stream associated with the first wireless station cannot be decoded based on an error check field in the MU packet; wherein determining that the at least one spatial stream of the first wireless station is unavailable is based on determining that the at least one spatial stream associated with the first wireless station cannot be decoded.

Aspect 7: The method of any of Aspects 2 to 6, wherein determining that the at least one spatial stream associated with the first wireless station is unavailable comprises: determining that the at least one spatial stream associated with the first wireless station cannot be received by the wireless AP at a suitable power level for the MU packet based on a maximum received power for the plurality of spatial streams and based on a difference between the respective power metric of the at least one spatial stream and the maximum received power being greater than a threshold.

Aspect 8: The method of any of Aspects 2 to 7, wherein determining the respective power metric based on the respective channel estimate comprises: determining a first receive chain of the plurality of receive chains having a maximum received power for each spatial stream in the plurality of spatial streams; and determining a second receive chain of the plurality of receive chains having a minimum received power for each spatial stream in the plurality of spatial streams.

Aspect 9: The method of any of Aspects 2 to 8, wherein the respective power metric corresponds to a correlation associated with a spatial stream and a receive chain.

Aspect 10: The method of any of Aspects 1 to 9, further comprising: determining a type of smoothing filter to apply to a respective spatial stream of the plurality of spatial streams based on at least one of received signal strength information and modulation and coding scheme (MCS) information; and filtering the respective spatial stream based on the determined type of smoothing filter.

Aspect 11: The method of Aspect 10, further comprising: determining parameters of the smoothing filter based on at least one of a number of spatial streams of the plurality of spatial streams, a bandwidth associated with the plurality of spatial streams, a resource unit (RU) assignment associated with the plurality of spatial streams, or a long training field (LTF) mode associated with the plurality of spatial streams.

Aspect 12: The method of any of Aspects 1 to 11, wherein processing the MU packet from the plurality of spatial streams without the at least one spatial stream associated with the first wireless station comprises: removing the at least one spatial stream associated with the first wireless station from a tracking matrix associated with a pilot sequence; performing an inverse error estimation of the tracking matrix based on removal of the at least one spatial stream; and generating a phase offset for the plurality of wireless stations based on the inverse error estimation.

Aspect 13: The method of Aspect 12, further comprising: adding a zero to the tracking matrix for the at least one spatial stream to generate the phase offset for the plurality of wireless stations.

Aspect 14: The method of any of Aspects 1 to 13, wherein processing the MU packet from the plurality of spatial streams without the at least one spatial stream associated with the first wireless station comprises: identifying a plurality of pilot tones transmitted by the plurality of wireless stations; determining, from the plurality of pilot tones, a respective phase offset associated with each of the plurality of wireless stations; setting a phase offset for the first wireless station to zero; and performing phase tracking using the respective phase offsets determined for the plurality of wireless stations based on setting the phase offset for the first wireless station to zero.

Aspect 15: The method of any of Aspects 1 to 14, wherein processing the MU packet from the plurality of spatial streams without the at least one spatial stream associated with the first wireless station comprises: removing one or more entries associated with the first wireless station from a demodulation matrix; and demodulating one or more spatial streams of the plurality of spatial streams based on removal of the one or more entries associated with the first wireless station from the demodulation matrix.

Aspect 16: A wireless communication device for wireless communication, comprising: at least one modem; at least one processor communicatively coupled with the at least one modem; and at least one memory communicatively coupled with the at least one processor and storing processor-readable code that, when executed by the at least one processor in conjunction with the at least one modem, is configured to: transmit, to a plurality of wireless stations including a first wireless station, a trigger frame configured to elicit a joint transmission, to the wireless communication device, of a multiuser (MU) packet over a plurality of spatial streams respectively associated with the plurality of wireless stations; receive the MU packet over the plurality of spatial streams, each spatial stream of the plurality of spatial streams being received by a plurality of receive chains of the wireless communication device; perform a channel estimation associated with each spatial stream of the plurality of spatial streams using each receive chain of the plurality of receive chains; determine that at least one spatial stream associated with the first wireless station is unavailable based on the channel estimation; and process the MU packet from the plurality of spatial streams without the at least one spatial stream.

Aspect 17: The wireless communication device of Aspect 16, wherein the processor-readable code, when executed by the at least one processor in conjunction with the at least one modem, is configured to: determine, for each spatial stream of the plurality of spatial streams for each receive chain of the plurality of receive chains, a respective power metric based on a respective channel estimate associated with each spatial stream of the plurality of spatial streams and each receive chain of the plurality of receive chains.

Aspect 18: The wireless communication device of Aspect 17, wherein, to determine that the at least one spatial stream associated with the first wireless station is unavailable, the processor-readable code, when executed by the at least one processor in conjunction with the at least one modem, is configured to: determine that the at least one spatial stream associated with the first wireless station was not transmitted by the first wireless station based on the respective power metric.

Aspect 19: The wireless communication device of Aspect 17, wherein, to determine that the at least one spatial stream associated with the first wireless station is unavailable, the processor-readable code, when executed by the at least one processor in conjunction with the at least one modem, is configured to: determine that the respective power metric for the at least one spatial stream associated with the first wireless station is less than a threshold; and determine that the at least one spatial stream associated with the first wireless station was not transmitted by the first wireless station based on the respective power metric being less than the threshold.

Aspect 20: The wireless communication device of Aspect 19, wherein the processor-readable code, when executed by the at least one processor in conjunction with the at least one modem, is configured to: determine the threshold based on a requested receive signal strength at the wireless communication device, wherein the trigger frame indicates the requested receive signal strength.

Aspect 21: The wireless communication device of any of Aspects 16 to 20, wherein the processor-readable code, when executed by the at least one processor in conjunction with the at least one modem, is configured to: determine that the at least one spatial stream associated with the first wireless station cannot be decoded based on an error check field in the MU packet; wherein determining that the at least one spatial stream of the first wireless station is unavailable is based determining that at least one spatial stream associated with the first wireless station cannot be decoded.

Aspect 22: The wireless communication device of any of Aspects 17 to 21, wherein, to determine that the at least one spatial stream associated with the first wireless station is unavailable, the processor-readable code, when executed by the at least one processor in conjunction with the at least one modem, is configured to: determine that the at least one spatial stream associated with the first wireless station cannot be received by the wireless communication device at a suitable power level for the MU packet based on a maximum received power for the plurality of spatial streams and based on a difference between the respective power metric of the at least one spatial stream and the maximum received power being greater than a threshold.

Aspect 23: The wireless communication device of any of Aspects 17 to 22, wherein, to determine the respective power metric based on the respective channel estimate, the processor-readable code, when executed by the at least one processor in conjunction with the at least one modem, is configured to: determine a first receive chain of the plurality of receive chains having a maximum received power for each spatial stream in the plurality of spatial streams; and determine a second receive chain of the plurality of receive chains having a minimum received power for each spatial stream in the plurality of spatial streams.

Aspect 24: The wireless communication device of any of Aspects 17 to 23, wherein the respective power metric corresponds to a correlation associated with a spatial stream and a receive chain.

Aspect 25: The wireless communication device of any of Aspects 16 to 24, the processor-readable code, when executed by the at least one processor in conjunction with the at least one modem, is configured to: determine a type of smoothing filter to apply to a respective spatial stream of the plurality of spatial streams based on at least one of received signal strength information and modulation and coding scheme (MCS) information; and filter the respective spatial stream based on the determined type of smoothing filter.

Aspect 26: The wireless communication device of Aspect 25, the processor-readable code, when executed by the at least one processor in conjunction with the at least one modem, is configured to: determine parameters of the smoothing filter based on at least one of a number of spatial streams of the plurality of spatial streams, a bandwidth associated with the plurality of spatial streams, a resource unit (RU) assignment associated with the plurality of spatial streams, or a long training field (LTF) mode associated with the plurality of spatial streams.

Aspect 27: The wireless communication device of any of Aspects 16 to 26, wherein, to process the MU packet from the plurality of spatial streams without the at least one spatial stream associated with the first wireless station, the processor-readable code, when executed by the at least one processor in conjunction with the at least one modem, is configured to: remove the at least one spatial stream associated with the first wireless station from a tracking matrix associated with a pilot sequence; perform an inverse error estimation of the tracking matrix based on removal of the at least one spatial stream; and generate a phase offset for the plurality of wireless stations based on the inverse error estimation.

Aspect 28: The wireless communication device of Aspect 27, wherein the processor-readable code, when executed by the at least one processor in conjunction with the at least one modem, is configured to: add a zero to the tracking matrix for at least one spatial stream to generate the phase offset for the plurality of wireless stations.

Aspect 29: The wireless communication device of any of Aspects 16 to 28, wherein, to process the MU packet from the plurality of spatial streams without the at least one spatial stream associated with the first wireless station, the processor-readable code, when executed by the at least one processor in conjunction with the at least one modem, is configured to: identify a plurality of pilot tones transmitted by the plurality of wireless stations; determine, from the plurality of pilot tones, a respective phase offset associated with each of the plurality of wireless stations; set a phase offset for the first wireless station to zero; and perform phase tracking using the respective phase offsets determined for the plurality of wireless stations based on setting the phase offset for the first wireless station to zero.

Aspect 30: The wireless communication device of any of Aspects 16 to 29, wherein, to process the MU packet from the plurality of spatial streams without the at least one spatial stream associated with the first wireless station, the processor-readable code, when executed by the at least one processor in conjunction with the at least one modem, is configured to: remove one or more entries associated with the first wireless station from a demodulation matrix; and demodulate one or more spatial streams of the plurality of spatial streams based on removal of the one or more entries associated with the first wireless station from the demodulation matrix.

Aspect 31: A computer-readable storage medium storing instructions that, when executed by one or more processors, cause the one or more processors to perform operations according to any of Aspects 1 to 30.

Aspect 32: An apparatus comprising one or more means for performing operations according to any of Aspects 1 to 30.

What is claimed is:

1. A method for wireless communication by a wireless access point, comprising:
   transmitting, to a plurality of wireless stations including a first wireless station, a trigger frame configured to elicit a joint transmission, to the wireless access point, of a multiuser (MU) packet over a plurality of spatial streams respectively associated with the plurality of wireless stations;
   receiving the MU packet over the plurality of spatial streams, each spatial stream of the plurality of spatial streams being received by a plurality of receive chains of the wireless access point;
   performing a channel estimation associated with each spatial stream of the plurality of spatial streams using each receive chain of the plurality of receive chains;
   determining that at least one spatial stream associated with the first wireless station is unavailable based on the channel estimation; and
   processing the MU packet from the plurality of spatial streams without the at least one spatial stream.

2. The method of claim 1, further comprising:
   determining, for each spatial stream of the plurality of spatial streams for each receive chain of the plurality of receive chains, a respective power metric based on a respective channel estimate associated with each spatial stream of the plurality of spatial streams and each receive chain of the plurality of receive chains.

3. The method of claim 2, wherein determining that the at least one spatial stream associated with the first wireless station is unavailable comprises:
   determining that the respective power metric for the at least one spatial stream associated with the first wireless station is less than a threshold; and
   determining that the at least one spatial stream associated with the first wireless station was not transmitted by the first wireless station based on the respective power metric being less than the threshold.

4. The method of claim 3, further comprising:
   determining the threshold based on a requested receive signal strength at the wireless access point, wherein the trigger frame indicates the requested receive signal strength.

5. The method of claim 1, further comprising:
   determining that the at least one spatial stream associated with the first wireless station cannot be decoded based on an error check field in the MU packet;
   wherein determining that the at least one spatial stream of the first wireless station is unavailable is based on determining that the at least one spatial stream associated with the first wireless station cannot be decoded.

6. The method of claim 2, wherein determining that the at least one spatial stream associated with the first wireless station is unavailable comprises:
   determining that the at least one spatial stream associated with the first wireless station cannot be received by the wireless access point at a suitable power level for the MU packet based on a maximum received power for the plurality of spatial streams and based on a difference between the respective power metric of the at least one spatial stream and the maximum received power being greater than a threshold.

7. The method of claim 2, wherein determining the respective power metric based on the respective channel estimate comprises:
   determining a first receive chain of the plurality of receive chains having a maximum received power for each spatial stream in the plurality of spatial streams; and
   determining a second receive chain of the plurality of receive chains having a minimum received power for each spatial stream in the plurality of spatial streams.

8. The method of claim 2, wherein the respective power metric corresponds to a correlation associated with a spatial stream and a receive chain.

9. The method of claim 1, further comprising:
   determining a type of smoothing filter to apply to a respective spatial stream of the plurality of spatial streams based on at least one of received signal strength information and modulation and coding scheme (MCS) information; and
   filtering the respective spatial stream based on the determined type of smoothing filter.

10. The method of claim 9, further comprising:
    determining parameters of the smoothing filter based on at least one of a number of spatial streams of the plurality of spatial streams, a bandwidth associated with the plurality of spatial streams, a resource unit (RU) assignment associated with the plurality of spatial streams, or a long training field (LTF) mode associated with the plurality of spatial streams.

11. The method of claim 1, wherein processing the MU packet from the plurality of spatial streams without the at least one spatial stream associated with the first wireless station comprises:
removing the at least one spatial stream associated with the first wireless station from a tracking matrix associated with a pilot sequence;
performing an inverse error estimation of the tracking matrix based on removal of the at least one spatial stream; and
generating a phase offset for the plurality of wireless stations based on the inverse error estimation.

12. The method of claim 11, further comprising:
adding a zero to the tracking matrix for the at least one spatial stream to generate the phase offset for the plurality of wireless stations.

13. The method of claim 1, wherein processing the MU packet from the plurality of spatial streams without the at least one spatial stream associated with the first wireless station comprises:
identifying a plurality of pilot tones transmitted by the plurality of wireless stations;
determining, from the plurality of pilot tones, a respective phase offset associated with each of the plurality of wireless stations;
setting a phase offset for the first wireless station to zero; and
performing phase tracking using the respective phase offsets determined for each of the plurality of wireless stations based on setting the phase offset for the first wireless station to zero.

14. The method of claim 1, wherein processing the MU packet from the plurality of spatial streams without the at least one spatial stream associated with the first wireless station comprises:
removing one or more entries associated with the first wireless station from a demodulation matrix; and
demodulating one or more spatial streams of the plurality of spatial streams based on removal of the one or more entries associated with the first wireless station from the demodulation matrix.

15. A wireless communication device for wireless communication, comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
transmit, to a plurality of wireless stations including a first wireless station, a trigger frame configured to elicit a joint transmission, to the wireless communication device, of a multiuser (MU) packet over a plurality of spatial streams respectively associated with the plurality of wireless stations;
receive the MU packet over the plurality of spatial streams, each spatial stream of the plurality of spatial streams being received by a plurality of receive chains of the wireless communication device;
perform a channel estimation associated with each spatial stream of the plurality of spatial streams using each receive chain of the plurality of receive chains;
determining that at least one spatial stream associated with the first wireless station is unavailable based on the channel estimation; and
process the MU packet from the plurality of spatial streams without the at least one spatial stream.

16. The wireless communication device of claim 15, wherein the processor-readable code, when executed by the at least one processor in conjunction with the at least one modem, is configured to:
determine, for each spatial stream of the plurality of spatial streams for each receive chain of the plurality of receive chains, a respective power metric based on a respective channel estimate associated with each spatial stream of the plurality of spatial streams and each receive chain of the plurality of receive chains.

17. The wireless communication device of claim 16, wherein, to determine that the at least one spatial stream associated with the first wireless station is unavailable, the processor-readable code, when executed by the at least one processor in conjunction with the at least one modem, is configured to:
determine that the respective power metric for the at least one spatial stream associated with the first wireless station is less than a threshold; and
determine that the at least one spatial stream associated with the first wireless station was not transmitted by the first wireless station based on the respective power metric being less than the threshold.

18. The wireless communication device of claim 17, wherein the processor-readable code, when executed by the at least one processor in conjunction with the at least one modem, is configured to:
determine the threshold based on a requested receive signal strength at the wireless communication device, wherein the trigger frame indicates the requested receive signal strength.

19. The wireless communication device of claim 15, wherein the processor-readable code, when executed by the at least one processor in conjunction with the at least one modem, is configured to:
determine that the at least one spatial stream associated with the first wireless station cannot be decoded based on an error check field in the MU packet;
wherein determining that the at least one spatial stream of the first wireless station is unavailable is based on determining that at least one spatial stream associated with the first wireless station cannot be decoded.

20. The wireless communication device of claim 16, wherein, to determine that the at least one spatial stream associated with the first wireless station is unavailable, the processor-readable code, when executed by the at least one processor in conjunction with the at least one modem, is configured to:
determine that the at least one spatial stream associated with the first wireless station cannot be received by the wireless communication device at a suitable power level for the MU packet based on a maximum received power for the plurality of spatial streams and based on a difference between the respective power metric of the at least one spatial stream and the maximum received power being greater than a threshold.

21. The wireless communication device of claim 16, wherein, to determine the respective power metric based on the respective channel estimate, the processor-readable code, when executed by the at least one processor in conjunction with the at least one modem, is configured to:

determine a first receive chain of the plurality of receive chains having a maximum received power for each spatial stream in the plurality of spatial streams; and determine a second receive chain of the plurality of receive chains having a minimum received power for each spatial stream in the plurality of spatial streams.

22. The wireless communication device of claim 16, wherein the respective power metric corresponds to a correlation associated with a spatial stream and a receive chain.

23. The wireless communication device of claim 15, the processor-readable code, when executed by the at least one processor in conjunction with the at least one modem, is configured to:

determine a type of smoothing filter to apply to a respective spatial stream of the plurality of spatial streams based on at least one of received signal strength information and modulation and coding scheme (MCS) information; and filter the respective spatial stream based on the determined type of smoothing filter.

24. The wireless communication device of claim 23, the processor-readable code, when executed by the at least one processor in conjunction with the at least one modem, is configured to:

determine parameters of the smoothing filter based on at least one of a number of spatial streams of the plurality of spatial streams, a bandwidth associated with the plurality of spatial streams, a resource unit (RU) assignment associated with the plurality of spatial streams, or a long training field (LTF) mode associated with the plurality of spatial streams.

25. The wireless communication device of claim 15, wherein, to process the MU packet from the plurality of spatial streams without the at least one spatial stream associated with the first wireless station, the processor-readable code, when executed by the at least one processor in conjunction with the at least one modem, is configured to:

remove the at least one spatial stream associated with the first wireless station from a tracking matrix associated with a pilot sequence;

perform an inverse error estimation of the tracking matrix based on removal of the at least one spatial stream; and generate a phase offset for the plurality of wireless stations based on the inverse error estimation.

26. The wireless communication device of claim 25, wherein the processor-readable code, when executed by the at least one processor in conjunction with the at least one modem, is configured to:

add a zero to the tracking matrix for the at least one spatial stream to generate the phase offset for the plurality of wireless stations.

27. The wireless communication device of claim 15, wherein, to process the MU packet from the plurality of spatial streams without the at least one spatial stream associated with the first wireless station, the processor-readable code, when executed by the at least one processor in conjunction with the at least one modem, is configured to:

identify a plurality of pilot tones transmitted by the plurality of wireless stations;

determine, from the plurality of pilot tones, a respective phase offset associated with each of the plurality of wireless stations;

set a phase offset for the first wireless station to zero; and perform phase tracking using the respective phase offsets determined for each of the plurality of wireless stations based on setting the phase offset for the first wireless station to zero.

28. The wireless communication device of claim 15, wherein, to process the MU packet from the plurality of spatial streams without the at least one spatial stream associated with the first wireless station, the processor-readable code, when executed by the at least one processor in conjunction with the at least one modem, is configured to:

remove one or more entries associated with the first wireless station from a demodulation matrix; and demodulate one or more spatial streams of the plurality of spatial streams based on removal of the one or more entries associated with the first wireless station from the demodulation matrix.

* * * * *